US008814669B2

(12) United States Patent
Walker et al.

(10) Patent No.: US 8,814,669 B2
(45) Date of Patent: Aug. 26, 2014

(54) SYSTEMS AND METHODS FOR POST-PLAY GAMING BENEFITS

(75) Inventors: Jay S. Walker, Ridgefield, CT (US); Daniel E. Tedesco, Huntington, CT (US); James A. Jorasch, New York, NY (US); Robert C. Tedesco, Fairfield, CT (US); Magdalena M. Fincham, Ridgefield, CT (US)

(73) Assignee: IGT, Las Vegas, NV (US)

( * ) Notice: Subject to any disclaimer, the term of this patent is extended or adjusted under 35 U.S.C. 154(b) by 1645 days.

(21) Appl. No.: 11/297,017

(22) Filed: Dec. 8, 2005

(65) Prior Publication Data

US 2006/0073884 A1 Apr. 6, 2006

(51) Int. Cl.
*A63F 13/00* (2014.01)

(52) U.S. Cl.
USPC .................... 463/29; 463/13; 463/30; 463/42

(58) Field of Classification Search
USPC ........................ 463/13, 20, 27, 29; 273/138.1
See application file for complete search history.

(56) References Cited

U.S. PATENT DOCUMENTS

| | | | | |
|---|---|---|---|---|
| 2,732,210 | A | 1/1956 | Heide | 463/60 |
| 4,339,798 | A | 7/1982 | Hedges et al. | |
| 4,621,814 | A | 11/1986 | Stepan et al. | 273/183 A |
| 4,636,951 | A | 1/1987 | Harlick | 364/412 |
| 4,669,731 | A | 6/1987 | Clarke | 273/143 R |
| 4,773,647 | A | 9/1988 | Okada et al. | 273/143 R |
| 4,837,422 | A | 6/1989 | Dethloff et al. | 235/380 |
| 4,837,728 | A | 6/1989 | Barrie et al. | 463/27 |
| 4,838,552 | A | 6/1989 | Hagiwara | 463/20 |
| 4,856,787 | A | 8/1989 | Itkis | |
| 4,926,327 | A | 5/1990 | Sidley | 364/412 |
| 5,042,809 | A | 8/1991 | Richardson | |
| 5,042,818 | A | 8/1991 | Weingardt | 273/292 |
| 5,083,271 | A | 1/1992 | Thacher et al. | |
| 5,116,055 | A | 5/1992 | Tracy | 463/27 |
| 5,123,649 | A | 6/1992 | Tiberio | 273/143 R |
| 5,152,529 | A | 10/1992 | Okada | |
| 5,159,549 | A | 10/1992 | Hallman, Jr. et al. | 364/412 |
| 5,173,851 | A | 12/1992 | Off et al. | 364/401 |
| 5,178,390 | A | 1/1993 | Okada | 273/143 R |

(Continued)

FOREIGN PATENT DOCUMENTS

| | | | |
|---|---|---|---|
| EP | 843272 A1 | 5/1998 | G06F 19/00 |
| GB | 2 161 008 A | 1/1986 | |
| WO | WO 96/08295 | 1/1986 | |
| WO | WO 03/018150 A1 | 3/2003 | |

OTHER PUBLICATIONS

Notice of Allowability for U.S. Appl. No. 09/052,835 dated Mar. 22, 2000, 2pp.

(Continued)

*Primary Examiner* — Dmitry Suhol
*Assistant Examiner* — Ankit Doshi
(74) *Attorney, Agent, or Firm* — Neal, Gerber & Eisenberg LLP

(57) ABSTRACT

According to some embodiments, systems, methods, and/or articles of manufacture are associated with determining whether a first condition associated with a first player of a gaming device is satisfied, determining whether a second condition associated with a second player of the gaming device is satisfied, and awarding, in the case that both the first and second conditions are determined to be satisfied, a benefit to the first player.

13 Claims, 7 Drawing Sheets

(56) References Cited

U.S. PATENT DOCUMENTS

| | | | | |
|---|---|---|---|---|
| 5,179,517 | A | 1/1993 | Sarbin et al. | 463/25 |
| 5,186,460 | A | 2/1993 | Fongeallaz et al. | |
| 5,242,163 | A | 9/1993 | Fulton | |
| 5,259,613 | A | 11/1993 | Marnell, II | |
| 5,265,874 | A | 11/1993 | Dickinson et al. | |
| 5,275,400 | A | 1/1994 | Weingardt et al. | |
| 5,280,909 | A | 1/1994 | Tracy | 273/138 A |
| 5,288,081 | A | 2/1994 | Breeding | |
| 5,290,033 | A | 3/1994 | Bittner et al. | |
| 5,324,035 | A | 6/1994 | Morris et al. | 273/138 A |
| 5,342,047 | A | 8/1994 | Heidel et al. | 273/85 CP |
| 5,342,049 | A | 8/1994 | Wichinsky et al. | 273/119 R |
| 5,344,144 | A | 9/1994 | Canon | 273/138 |
| 5,356,140 | A | 10/1994 | Dabrowski et al. | 273/85 CP |
| 5,359,510 | A | 10/1994 | Sabaliauskas | |
| 5,377,973 | A | 1/1995 | Jones et al. | 273/85 CP |
| 5,393,057 | A | 2/1995 | Marnell, II | |
| 5,393,061 | A | 2/1995 | Manship et al. | 273/143 R |
| 5,397,125 | A * | 3/1995 | Adams | 463/20 |
| 5,409,225 | A | 4/1995 | Kelly et al. | 273/118 A |
| 5,472,194 | A | 12/1995 | Breeding et al. | 463/27 |
| 5,472,197 | A | 12/1995 | Gwiasda et al. | |
| 5,482,289 | A | 1/1996 | Weingardt | 273/269 |
| 5,494,287 | A | 2/1996 | Manz | 273/143 R |
| 5,511,781 | A | 4/1996 | Wood et al. | 273/85 CP |
| 5,531,440 | A | 7/1996 | Dabrowski et al. | 463/12 |
| 5,544,892 | A | 8/1996 | Breeding | |
| 5,559,312 | A | 9/1996 | Lucero | 463/25 |
| 5,560,603 | A | 10/1996 | Seelig et al. | |
| 5,564,700 | A | 10/1996 | Celona | 463/27 |
| 5,564,701 | A | 10/1996 | Dettor | |
| 5,580,309 | A | 12/1996 | Piechowiak et al. | |
| 5,593,349 | A | 1/1997 | Miguel et al. | 463/30 |
| 5,597,163 | A | 1/1997 | Takemoto et al. | 273/309 |
| 5,603,502 | A | 2/1997 | Nakagawa | 273/292 |
| 5,611,535 | A | 3/1997 | Tiberio | 273/143 R |
| 5,611,730 | A | 3/1997 | Weiss | |
| 5,621,201 | A | 4/1997 | Langhans et al. | 235/380 |
| 5,639,088 | A | 6/1997 | Schneider et al. | 273/138.2 |
| 5,645,486 | A | 7/1997 | Nagao et al. | |
| 5,655,961 | A | 8/1997 | Acres et al. | |
| 5,664,998 | A | 9/1997 | Seelig et al. | |
| 5,674,128 | A | 10/1997 | Holch et al. | 463/42 |
| 5,695,400 | A | 12/1997 | Fennell, Jr. et al. | 463/42 |
| 5,702,304 | A | 12/1997 | Acres et al. | |
| 5,711,715 | A | 1/1998 | Ringo et al. | |
| 5,741,183 | A | 4/1998 | Acres et al. | |
| 5,746,656 | A | 5/1998 | Bezick et al. | |
| 5,752,882 | A | 5/1998 | Acres et al. | |
| 5,755,621 | A | 5/1998 | Marks et al. | |
| 5,758,875 | A | 6/1998 | Giacalone, Jr. | |
| 5,761,647 | A | 6/1998 | Boushy | 705/10 |
| 5,766,076 | A | 6/1998 | Pease et al. | 463/27 |
| 5,768,382 | A | 6/1998 | Schneier et al. | 380/251 |
| 5,769,716 | A | 6/1998 | Saffari et al. | |
| 5,770,533 | A | 6/1998 | Franchi | 763/42 |
| 5,772,506 | A | 6/1998 | Marks et al. | 463/13 |
| 5,772,509 | A | 6/1998 | Weiss | 463/16 |
| 5,779,242 | A | 7/1998 | Kaufman | |
| 5,779,544 | A | 7/1998 | Seelig et al. | |
| 5,779,549 | A | 7/1998 | Walker et al. | |
| 5,806,045 | A | 9/1998 | Biorge et al. | |
| 5,811,772 | A | 9/1998 | Lucero | 235/380 |
| 5,816,918 | A | 10/1998 | Kelly et al. | |
| 5,820,459 | A | 10/1998 | Acres et al. | |
| 5,820,460 | A | 10/1998 | Fulton | |
| 5,823,874 | A | 10/1998 | Adams | |
| 5,823,879 | A | 10/1998 | Goldberg et al. | |
| 5,833,536 | A | 11/1998 | Davids et al. | |
| 5,836,586 | A | 11/1998 | Marks et al. | 273/292 |
| 5,836,817 | A | 11/1998 | Acres et al. | |
| 5,848,932 | A | 12/1998 | Adams | 463/20 |
| 5,851,147 | A | 12/1998 | Stupak et al. | 463/13 |
| 5,855,008 | A | 12/1998 | Goldhaber et al. | 705/14 |
| 5,855,516 | A | 1/1999 | Eiba | |
| 582,260 | A | 3/1999 | Marks et al. | 463/13 |
| 5,876,284 | A | 3/1999 | Acres et al. | |
| 5,882,260 | A | 3/1999 | Marks et al. | |
| 5,882,262 | A | 3/1999 | Ballhorn | 463/43 |
| 5,898,587 | A | 4/1999 | Bell et al. | |
| 5,902,184 | A | 5/1999 | Bennett | |
| 5,910,048 | A | 6/1999 | Feinberg | 463/25 |
| 5,911,418 | A | 6/1999 | Adams | |
| 5,917,725 | A | 6/1999 | Thacher et al. | |
| 5,919,088 | A | 7/1999 | Weiss | |
| 5,924,927 | A | 7/1999 | Matsuura et al. | |
| 5,935,000 | A | 8/1999 | Sanchez, III et al. | |
| 5,941,772 | A | 8/1999 | Paige | |
| 5,947,820 | A | 9/1999 | Morro et al. | |
| 5,951,397 | A | 9/1999 | Dickinson | |
| 5,964,660 | A | 10/1999 | James et al. | 463/1 |
| 5,967,896 | A | 10/1999 | Jorasch et al. | 463/25 |
| 5,976,015 | A | 11/1999 | Seelig et al. | |
| 5,979,702 | A | 11/1999 | Hennessey et al. | 221/206 |
| 5,980,384 | A | 11/1999 | Barrie | |
| 5,993,316 | A | 11/1999 | Coyle et al. | |
| 5,997,400 | A | 12/1999 | Seelig et al. | |
| 6,010,404 | A | 1/2000 | Walker et al. | 463/21 |
| 6,012,982 | A | 1/2000 | Piechowiak et al. | |
| 6,012,983 | A | 1/2000 | Walker et al. | |
| 6,019,374 | A | 2/2000 | Breeding | |
| 6,024,642 | A | 2/2000 | Stupak | 463/20 |
| 6,033,307 | A | 3/2000 | Vancura | 463/20 |
| 6,039,648 | A | 3/2000 | Guinn et al. | |
| 6,048,271 | A | 4/2000 | Barcelou | |
| 6,077,162 | A | 6/2000 | Weiss | |
| 6,077,163 | A | 6/2000 | Walker et al. | 463/26 |
| 6,082,887 | A | 7/2000 | Feuer et al. | |
| 6,089,975 | A | 7/2000 | Dunn | |
| 6,089,976 | A | 7/2000 | Schneider et al. | |
| 6,089,980 | A | 7/2000 | Gauselmann | 463/27 |
| 6,093,100 | A | 7/2000 | Singer et al. | |
| 6,102,400 | A | 8/2000 | Scott et al. | |
| 6,110,043 | A | 8/2000 | Olsen | |
| 6,113,098 | A | 9/2000 | Adams | |
| 6,113,102 | A | 9/2000 | Marks et al. | 273/292 |
| 6,117,011 | A | 9/2000 | Lvov | 463/25 |
| 6,120,378 | A | 9/2000 | Moody et al. | |
| 6,128,550 | A | 10/2000 | Heidel et al. | |
| 6,135,882 | A | 10/2000 | Kadlic | 463/13 |
| 6,135,885 | A | 10/2000 | Lermusiaux | |
| 6,142,872 | A | 11/2000 | Walker et al. | |
| 6,146,273 | A | 11/2000 | Olsen | |
| 6,159,095 | A | 12/2000 | Frohm et al. | |
| 6,159,097 | A | 12/2000 | Gura | |
| 6,159,098 | A | 12/2000 | Slomiany et al. | |
| 6,162,122 | A | 12/2000 | Acres et al. | |
| 6,165,071 | A | 12/2000 | Weiss | |
| 6,165,072 | A | 12/2000 | Davis et al. | |
| 6,168,521 | B1 | 1/2001 | Luciano et al. | |
| 6,174,237 | B1 | 1/2001 | Stephenson | |
| 6,186,893 | B1 | 2/2001 | Walker et al. | |
| 6,190,255 | B1 | 2/2001 | Thomas et al. | |
| 6,193,606 | B1 | 2/2001 | Walker et al. | |
| 6,203,010 | B1 | 3/2001 | Jorasch et al. | |
| 6,206,782 | B1 | 3/2001 | Walker et al. | |
| 6,210,275 | B1 | 4/2001 | Olsen | |
| 6,210,277 | B1 | 4/2001 | Stefan | |
| 6,220,959 | B1 | 4/2001 | Holmes, Jr. et al. | 463/42 |
| 6,224,482 | B1 | 5/2001 | Bennett | |
| 6,224,484 | B1 * | 5/2001 | Okuda et al. | 463/27 |
| 6,224,486 | B1 | 5/2001 | Walker et al. | |
| 6,231,445 | B1 | 5/2001 | Acres | |
| 6,234,897 | B1 | 5/2001 | Frohm et al. | 463/20 |
| 6,238,287 | B1 | 5/2001 | Komori et al. | |
| 6,244,958 | B1 | 6/2001 | Acres | |
| 6,247,643 | B1 | 6/2001 | Lucero | 235/380 |
| 6,257,981 | B1 | 7/2001 | Acres et al. | |
| 6,270,412 | B1 | 8/2001 | Crawford et al. | 463/20 |
| 6,287,202 | B1 | 9/2001 | Pascal et al. | |
| 6,309,299 | B1 | 10/2001 | Weiss | |
| 6,312,332 | B1 | 11/2001 | Walker et al. | |
| 6,315,668 | B1 | 11/2001 | Metke et al. | |
| 6,319,122 | B1 | 11/2001 | Packes, Jr. et al. | |

(56) References Cited

U.S. PATENT DOCUMENTS 6,319,127 B1 11/2001 Walker et al.
6,322,451 B1 11/2001 Miura
6,334,614 B1 1/2002 Breeding
6,334,814 B1 1/2002 Adams ............ 463/20
6,352,479 B1 3/2002 Sparks, II
6,354,592 B1 3/2002 Virzi
6,361,441 B1 3/2002 Walker et al.
6,364,765 B1 4/2002 Walker et al.
6,375,567 B1 4/2002 Acres
6,375,568 B1 4/2002 Roffman et al. ............ 463/23
6,394,456 B1 5/2002 Long ............ 273/292
6,406,371 B1 6/2002 Baba et al.
6,409,602 B1 6/2002 Wiltshire et al.
6,416,408 B2 7/2002 Tracy et al.
6,419,583 B1 7/2002 Crumby et al.
6,425,828 B2 7/2002 Walker et al.
6,431,983 B2 8/2002 Acres
6,439,993 B1 8/2002 O'Halloran ............ 463/16
RE37,885 E 10/2002 Acres et al.
6,461,241 B1 10/2002 Webb et al. ............ 463/20
6,471,208 B2 10/2002 Yoseloff et al. ............ 273/143 R
6,471,591 B1 10/2002 Crumby
6,482,089 B2 11/2002 DeMar et al. ............ 463/20
6,503,145 B1 1/2003 Webb
6,503,146 B2 1/2003 Walker et al. ............ 463/25
6,508,709 B1 1/2003 Karmarkar
6,514,139 B2 2/2003 Levitan
6,514,144 B2 2/2003 Riendeau et al. ............ 463/42
6,533,664 B1 3/2003 Crumby
6,543,774 B1 4/2003 Taylor
6,572,471 B1 6/2003 Bennett
6,585,592 B1 7/2003 Crumby
6,604,997 B2 8/2003 Saidakovsky et al.
6,607,195 B2 8/2003 Vancura
6,607,438 B2 8/2003 Baerlocher et al.
6,625,578 B2 9/2003 Spaur et al.
6,638,170 B1 10/2003 Crumby
6,645,074 B2 11/2003 Thomas et al. ............ 463/20
6,648,753 B1 11/2003 Tracy et al.
6,652,378 B2 11/2003 Cannon et al.
6,656,047 B1 12/2003 Tarantino et al.
6,656,048 B2 12/2003 Olsen ............ 463/25
6,663,487 B1 12/2003 Ladner ............ 463/13
6,688,973 B2 2/2004 Satloff et al.
6,692,353 B2 2/2004 Walker et al. ............ 463/16
6,699,124 B2 3/2004 Suchocki
6,712,699 B2 3/2004 Walker et al.
6,712,702 B2 3/2004 Goldberg et al.
6,729,959 B1 5/2004 Moore et al.
6,733,390 B2 5/2004 Walker et al.
6,755,743 B1 6/2004 Yamashita et al.
6,775,580 B2 8/2004 Jira et al.
6,786,824 B2 9/2004 Cannon
6,790,143 B2 9/2004 Crumby
6,800,030 B2 10/2004 Acres
6,805,629 B1 10/2004 Weiss
6,814,664 B2 11/2004 Baerlocher et al.
6,817,948 B2 11/2004 Pascal et al.
6,832,958 B2 12/2004 Acres et al.
6,837,793 B2 1/2005 McClintic
6,843,724 B2 1/2005 Walker et al.
6,843,725 B2 1/2005 Nelson
6,848,997 B1 2/2005 Hashimoto et al.
6,860,808 B2 3/2005 Levitan
6,860,810 B2 3/2005 Cannon et al.
6,863,612 B2 3/2005 Willis
6,869,361 B2 3/2005 Sharpless et al.
6,875,110 B1 4/2005 Crumby
6,884,167 B2 4/2005 Walker et al.
6,887,151 B2 5/2005 Leen et al.
6,887,159 B2 5/2005 Leen et al.
6,890,258 B2 5/2005 Weiss
6,896,616 B2 5/2005 Weiss
6,899,628 B2 5/2005 Leen et al.
6,902,478 B2 6/2005 McClintic ............ 463/16
6,908,390 B2 6/2005 Nguyen et al.
6,923,719 B2 8/2005 Wolf ............ 463/16
6,929,546 B2 8/2005 Moore et al.
6,929,550 B2 8/2005 Hisada
6,932,708 B2 8/2005 Yamashita et al.
6,935,958 B2 8/2005 Nelson
6,939,229 B2 9/2005 McClintic
RE38,812 E 10/2005 Acres et al.
6,964,608 B1 11/2005 Koza
6,966,832 B2 11/2005 Leen et al.
6,979,267 B2 12/2005 Leen et al.
7,192,352 B2 3/2007 Walker et al.
7,303,475 B2 12/2007 Britt
7,364,510 B2 4/2008 Walker et al.
7,387,571 B2 6/2008 Walker et al.
2001/0009865 A1 7/2001 Demar et al.
2002/0028707 A1 3/2002 Pascal et al.
2002/0039923 A1 4/2002 Cannon et al.
2002/0055381 A1 5/2002 Tarantino ............ 463/20
2002/0151342 A1 10/2002 Tracy et al.
2002/0160825 A1 10/2002 Nicastro et al.
2002/0177483 A1 11/2002 Cannon
2003/0027628 A1 2/2003 Luciano ............ 463/20
2003/0050111 A1 3/2003 Saffari
2003/0060264 A1 3/2003 Chilton et al.
2003/0064807 A1 4/2003 Walker et al. ............ 463/42
2003/0078101 A1 4/2003 Schneider et al. ............ 463/42
2003/0092484 A1 5/2003 Schneider et al. ............ 463/25
2003/0114218 A1 6/2003 McClintic
2003/0130041 A1 7/2003 Pascal et al.
2003/0176219 A1 9/2003 Manfredi et al.
2003/0186745 A1 10/2003 Nguyen et al.
2003/0190960 A1 10/2003 Jokipii et al.
2003/0199321 A1 10/2003 Williams
2003/0224852 A1 12/2003 Walker et al. ............ 463/20
2004/0029631 A1 2/2004 Duhamel
2004/0132521 A1 7/2004 Peterson
2004/0142750 A1 7/2004 Glisson et al.
2004/0176167 A1 9/2004 Michaelson et al.
2004/0204226 A1 10/2004 Foster et al.
2004/0204243 A1 10/2004 de Mello Costa
2004/0224773 A1 11/2004 Sham
2004/0229700 A1 11/2004 Cannon et al.
2004/0242297 A1 12/2004 Walker et al.
2004/0242325 A1 12/2004 Levitan et al.
2004/0248652 A1 12/2004 Massey et al.
2005/0005127 A1 1/2005 Rowe et al.
2005/0020352 A1 1/2005 Chilton et al.
2005/0043072 A1 2/2005 Nelson
2005/0043088 A1 2/2005 Nguyen et al.
2005/0043089 A1 2/2005 Nguyen et al.
2005/0043094 A1 2/2005 Nguyen et al.
2005/0054431 A1 3/2005 Walker et al.
2005/0054446 A1 * 3/2005 Kammler et al. ............ 463/42
2005/0063072 A1 3/2005 Harada
2005/0071024 A1 3/2005 Henshaw
2005/0102047 A1 5/2005 Ottofy
2005/0148380 A1 7/2005 Cannon et al.
2005/0153760 A1 7/2005 Varley
2005/0170892 A1 8/2005 Atkinson
2005/0181856 A1 * 8/2005 Cannon et al. ............ 463/16
2005/0192089 A1 9/2005 Blatter et al.
2005/0208989 A1 9/2005 Kane et al.
2005/0215310 A1 9/2005 Boyd et al.
2005/0221882 A1 10/2005 Nguyen et al.
2005/0233794 A1 10/2005 Cannon et al.
2005/0255919 A1 11/2005 Nelson
2005/0267610 A1 12/2005 Shinoda
2005/0278041 A1 12/2005 Bortnik et al.
2005/0288101 A1 12/2005 Lockton et al.
2005/0288803 A1 12/2005 Ropp et al.
2006/0003835 A1 1/2006 Olive
2006/0019734 A1 1/2006 Roemer
2006/0019744 A1 1/2006 Roemer
2006/0030407 A1 2/2006 Thayer
2006/0030959 A1 2/2006 Duhamel
2006/0030960 A1 2/2006 Duhamel et al.
2006/0040735 A1 2/2006 Baerlocher
2006/0055113 A1 3/2006 Levi

(56) References Cited

U.S. PATENT DOCUMENTS

| | | | |
|---|---|---|---|
| 2006/0058103 A1 | 3/2006 | Danieli et al. |
| 2006/0063580 A1 | 3/2006 | Nguyen et al. |
| 2006/0082056 A1 | 4/2006 | Kane et al. |
| 2006/0089189 A1 | 4/2006 | Harvey |
| 2006/0105839 A1 | 5/2006 | Graeve et al. |
| 2006/0128453 A1 | 6/2006 | Hoffman |
| 2006/0128472 A1 | 6/2006 | Beavers |
| 2006/0135253 A1 | 6/2006 | George et al. |
| 2006/0136079 A1 | 6/2006 | Stern |
| 2006/0138728 A1 | 6/2006 | Gordon et al. |
| 2006/0148565 A1 | 7/2006 | Gauselmann et al. |
| 2006/0157934 A1 | 7/2006 | Yoseloff et al. |
| 2006/0161276 A1 | 7/2006 | Soltani |
| 2006/0178185 A1 | 8/2006 | Weis |
| 2006/0178202 A1 | 8/2006 | Hughes et al. |
| 2006/0229122 A1 | 10/2006 | Macke |
| 2006/0232012 A1 | 10/2006 | Boyer |
| 2006/0241795 A1 | 10/2006 | Weingardt et al. |
| 2006/0247012 A1 | 11/2006 | Walker et al. |
| 2006/0247955 A1 | 11/2006 | Humphrey |
| 2006/0252521 A1 | 11/2006 | Gururajan et al. |
| 2006/0252554 A1 | 11/2006 | Gururajan et al. |
| 2006/0258427 A1 | 11/2006 | Rowe et al. |
| 2007/0015587 A1 | 1/2007 | Glisson et al. |
| 2007/0087823 A1 | 4/2007 | Walker et al. |
| 2007/0090599 A1 | 4/2007 | Hamilton |
| 2007/0117621 A1 | 5/2007 | Walker et al. |
| 2007/0129147 A1 | 6/2007 | Gagner |
| 2007/0135950 A1 | 6/2007 | Oliveras |
| 2007/0135951 A1 | 6/2007 | Romik et al. |
| 2007/0167239 A1 | 7/2007 | O'Rourke |
| 2007/0173318 A1 | 7/2007 | Abbott |
| 2007/0218968 A1 | 9/2007 | Snow et al. |
| 2007/0243936 A1 | 10/2007 | Binenstock et al. |
| 2007/0259709 A1 | 11/2007 | Kelly et al. |

OTHER PUBLICATIONS

Notice of Allowability for U.S. Appl. No. 09/052,835 dated Mar. 13, 2000, 9pp.

Office Action for U.S. Appl. No. 09/108,827 dated Oct. 26, 2000, 8pp.

Office Action for U.S. Appl. No. 09/108,827 dated Mar. 23, 2000, 12pp.

Notice of Allowability for U.S. Appl. No. 09/108,827 dated Jun. 15, 2001, 3pp.

Office Action for U.S. Appl. No. 10/006,402 dated Mar. 12, 2003, 14pp.

Office Action for U.S. Appl. No. 10/006,402 dated Sep. 8, 2003, 7pp.

Notice of Allowability for U.S. Appl. No. 10/006,402 dated Jan. 28, 2004.

Author Unknown, "Hot Slots & Reel Deals", Atlantic City Insider, Oct. 1996, vol. I, No. 2., 5pp.

"Mega Vigil", Las Vegas Adviser, Jul. 1998 at p. 12.

Office Action for U.S. Appl. No. 09/152,405, dated Mar. 7, 2000, 14pp.

Notice of Allowability for U.S. Appl. No. 09/152,402, dated Sep. 6, 2000, 5pp.

Office Action for U.S. Appl. No. 09/793,020, dated Sep. 28, 2001, 10pp.

Office Action for U.S. Appl. No. 10/190,722, dated Dec. 17, 2003, 10pp.

Notice of Allowability for U.S. Appl. No. 10/190,722, dated Jun. 18, 2004, 8pp.

Office Action for U.S. Appl. No. 10/190,722, dated Sep. 10, 2003, 4pp.

Office Action for U.S. Appl. No. 10/869,975, dated May 15, 2007, 12pp.

Office Action for Application for U.S. Appl. No. 10/869,975, dated Sep. 22, 2006, 20pp.

Grochowski, John, "Players Look for Edge With Casino Gimmicks", Chicago Sun-Times, Aug. 25, 1995, Section: Weekend Plus, Gaming, p. 15, NC., 2pp.

Rose, Bob, "New Ways for the House to Win", St. Louis Post-Dispatch, Oct. 3, 1996, Section: Get Out, p. 50, 2pp.

"Triple Play Poker Takes Casino Industry by Storm", IGT Press Releases, Feb. 18, 1998 (http://www.igtgame.com/press/02/18/98.html), 2pp.

Website: Brokopp, John G., "One Way to Manipulate Players' Clubs", Casino City Times, Feb. 6, 2001, (http://brokopp.casinocitytimes.com/articles/534.html), 3pp.

Dancer, Bob and Compton, Jeffrey, "Player's Edge: Cannery's machines tighter than most locals' casinos", Las Vegas Review-Journal (Nevada), Jan. 10, 2003, 2pp.

Website: Brokopp, John G., "Player's Club Strategy for Couples", Casino City Times, Dec. 3, 2003, (http://brokopp.casinocitytimes.com/articles/8065.html)., 3pp.

Website: "Tunica Casino Slot and Table Play Club", (http://www.tunica-ms.com/casino__slot__clubs.htm), download date: Mar. 26, 2004, 3pp.

Office Action for U.S. Appl. No. 10/811,583, dated Jun. 27, 2006, 12pp.

Office Action for U.S. Appl. No. 10/811,583, dated Jan. 31, 2007, 17pp.

Office Action for U.S. Appl. No. 10/811,583, dated Jul. 10, 2007, 17pp.

Office Action for U.S. Appl. No. 10/794,338, dated Feb. 27, 2007, 12pp.

Office Action for U.S. Appl. No. 10/794,338, dated Jan. 30, 2007, 12pp.

Office Action for U.S. Appl. No. 10/794,338, dated Aug. 11, 2006, 12pp.

Office Action for U.S. Appl. No. 10/794,338, dated Dec. 20, 2005, 8pp.

Office Action for U.S. Appl. No. 10/254,831, dated Sep. 22, 2006, 23pp.

Office Action for Application No. 10/254,831, dated Mar. 8, 2007, 22pp.

Office Action for U.S. Appl. No. 11/422,778, dated Mar. 20, 2007, 15pp.

Website: CC&GTCC 3rd Annual Championship Poker Challenge during the CC&GTCC Convention:, (http://www.ccgtcc.com/poker2001.htm).

Website: "Money Time at Casino Windsor", (http://www.casinowindsor.com/casino/slots/moneytime.htm), download date: Jul. 25, 2001, 1 pg.

Fine, Adam, "Player's Network Gaming Guide Article—Big River", The Casino Player, (http://www.players network.com/travel/articles/big-river001,005.html), download date: Jul. 25, 2001, 2pp.

Website: "Casino Circle! Presents $$$ Free $$$ Online Slot Tournaments and other Choice Online Casino Games of Chance, Luck and Skill that Pay-Off!", (http://www.sidewalkshoppes.com/slots__free__tournaments.html), download date: Jul. 26, 2001, 8pp.

Website: "Casinos featuring Slot Tournaments in Las Vegas—Slot tournaments and how they work", (http://interexna.com/tournaments.html), download date: Jul. 26, 2001, 2pp.

Website: "gameland.com", (http://gameland.com/home/), download date: Sep. 5, 2001, 2pp.

Office Action for U.S. Appl. No. 10/067,576, dated Feb. 28, 2003, 13pp.

Office Action for U.S. Appl. No. 11/427,131, dated Apr. 3, 2007, 13pp.

Office Action for U.S. Appl. No. 11/427,131, dated Aug. 22, 2007, 9pp.

Office Action for U.S. Appl. No. 11/427,131, dated Sep. 12, 2006, 10 pp.

Notice of Allowability for U.S. Appl. No. 09/793,020, dated Feb. 26, 2001, 4pp.

Notice of Allowability for U.S. Appl. No. 09/793,020, dated Feb. 26, 2001, 7pp.

Office Action for U.S. Appl. No. 10/414,934, dated Nov. 16, 2006, 28pp.

(56) References Cited

OTHER PUBLICATIONS

Office Action for U.S. Appl. No. 10/794,338, dated Aug. 1, 2007, 13pp.
Advisory Action for U.S. Appl. No. 10/794,338, dated Oct. 1, 2007, 3pp.
PCT International Search Report for International Application No. PCT/US06/61794, filed Dec. 8, 2006, in the name of Walker et al., and entitled Systems and Methods for Post-Play Gaming Benefits, mailed Sep. 26, 2007.

* cited by examiner

520

| PLAYER ID 522 | MACHINE ID 524 | TIME STAMP 526 | WAGER AMOUNT 528 | OUTCOME 530 | PAYOUT 532 |
|---|---|---|---|---|---|
| ABC-100-F | GMS-001 | 11/8/05, 3:30PM | $5 | Cherry-Lemon-Bar | $0 |
| ABC-100-F | GMS-001 | 11/8/05, 3:31PM | $5 | Cherry-Lemon-Bar | $0 |
| ABC-100-F | GMS-001 | 11/8/05, 3:33PM | $5 | Cherry-Lemon-Bar | $0 |
| ABC-100-F | GMS-001 | 11/8/05, 3:38PM | $5 | Cherry-Lemon-Bar | $0 |
| ABC-100-F | GMS-001 | 11/8/05, 3:40PM | $15 | Pickle-Plum-Pear | $0 |
| ABC-100-F | GMS-945 | 11/8/05, 4:01PM | $3 | Mouse-Cheese-Cheese | $25 |
| ABC-100-F | GMS-213 | 11/8/05, 4:27PM | $5 | Seashell-Surfboard-Lobster | $0 |
| ABC-100-F | GMS-001 | 11/8/05, 5:50PM | $15 | Star-Cherry-Peach | $0 |
| ABC-234-D | GMS-001 | 11/8/05, 5:59PM | $10 | 7-7-7-7-7 | $7,000 |
| FVG-347-A | IWT-444 | 11/9/05, 2:17AM | $5 | 9h, Jd, 5s, 3h, As | $0 |
| YYU-938-X | IWT-444 | 11/9/05, 9:45AM | $5 | Ah, Qh, Kh, Jh, 10h | $20,000 |

FIG. 5

640

| POST-PLAY BENEFIT ID 642 | PRE-QUALIFICATION CONDITION(S) 644a | TRIGGERING CONDITION(S) 644b | OTHER CONDITION(S) 644c | POST-PLAY BENEFIT 646 |
|---|---|---|---|---|
| PPB-001 | First player wagered $50 at a first machine in one day | Second player wins > $5000 at first machine within 10 min. of first player's last wager at first machine | None | $500 |
| PPB-002 | First player plays at 3 machines within 1 hour | Second player wins at one of the 3 machines the same day | None | 50% off coupon for casino buffet |
| PPB-003 | First player did not receive royal flush at first machine on a given day | Second player wins royal flush at first machine same day | None | First player automatically receives 3 cards toward royal flush at next video poker play |
| PPB-004 | First player receives outcome of "Bonus-Bonus-Bonus" at first machine on a given day | Second player wins over $20 from a single outcome the same day | When triggering condition, first player is in flat-rate session at second machine within the same bank as first machine | 10 minute extension of first player's flat-rate session at second machine |
| PPB-005 | First player left first machine a net loser on a given day | Second player received "Share 10% with prior player" outcome | Within ± 10 minutes of triggering condition, first player transacts at second machine within same bank as first machine | 10% of second player's net winnings |
| PPB-006 | First player left first machine a net loser on a given day | Second player wins between $500 and $999 from a single outcome within 1 hour of first player's last wager at first machine | First player is registered as a guest of the casino hotel | $5 machine credit at any machine |
| PPB-007 | First player left first machine a net loser on a given day | Second player wins $100 to $1000 from one outcome 1 to 2 hours after first player's last wager at first machine | First player is registered as a guest of the casino hotel | $2.50 machine credit at any machine |
| PPB-008 | First player wagered and lost between $1 and $30 at a first machine on a given day | Second player wins >= $30 at first machine within 1 hour after first player's last wager at first machine | None | First player refunded amount wagered at first machine |

FIG. 6

SYSTEMS AND METHODS FOR POST-PLAY GAMING BENEFITS

BACKGROUND

Modern casinos offer players a wide variety of game alternatives, including table games such as craps, blackjack and poker. Some games, such as slot machines for example, may generally constitute a major source of profit for a casino. Casinos therefore may strive to increase the attractiveness and playability of such machines (e.g., slot machines, video poker machines, and/or other machines or games) in ways that attract and retain players.

More particularly, it is of substantial value to a casino to facilitate good feelings and emotions of players to encourage lengthier and/or faster play. When a player terminates play at a machine, particularly a machine at which the player has "invested" a large amount of time for example, the player may experience negative feelings and/or emotions if the player has failed to win a certain amount and/or has lost funds at the machine. Similarly, the player may experience jealousy toward other players that are perceived to win and/or do win at the machine subsequent to the original player's failed attempts.

BRIEF DESCRIPTION OF THE FIGURES

Various embodiments are described herein with reference to the accompanying figures. In the figures, like reference numerals generally indicate identical and/or functionally similar elements. The leftmost digit(s) of a reference numeral typically identifies the figure in which the reference numeral appears. Some figures and accompanying descriptions presented herein are indicative of exemplary arrangements for stored representations of information. A number of other arrangements may be employed instead of or in addition to the tables and/or data storage structures depicted herein. Similarly, illustrated entries represent exemplary information, but the number and content of the entries may be different from those illustrated herein. A brief description of the figures follows.

FIG. 5 is a schematic view of a player database according to some embodiments;

FIG. 6 is a schematic view of a post-play benefit database according to some embodiments.

DETAILED DESCRIPTION

I. Introduction

Figure 1:
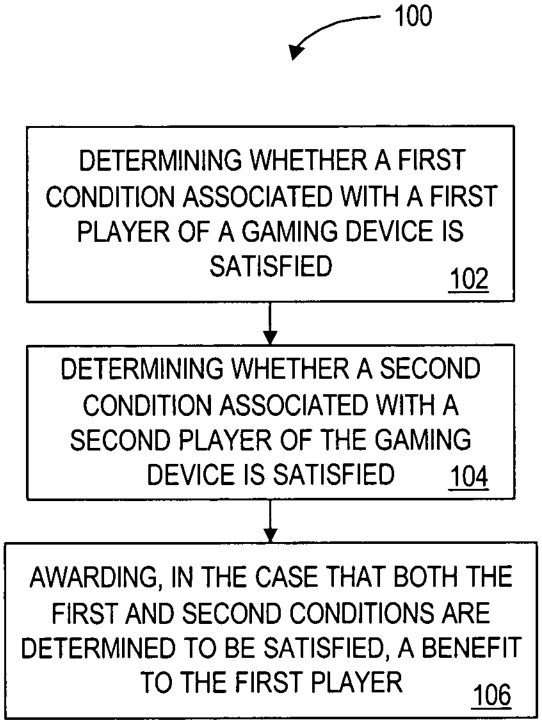
FIG. 1 is flow diagram of a method according to some embodiments.

Some embodiments are generally directed to gaming devices and benefits received there from. Some embodiments provide for systems, methods, and articles of manufacture that allow a player of a gaming device to receive benefits associated with the gaming device, even when the player is not involved in a current session of play at the gaming device.

For example, Applicants have recognized that it may be advantageous in some circumstances to allow a player of a gaming device to realize benefits associated with the gaming device even when the player is not currently involved in a session of play at the gaming device. A player that plays at a gaming device may become "invested" in future outcomes of the gaming device associated with subsequent players, for example, and/or the player may otherwise become entitled to and/or earn benefits after the player's session at the gaming device has terminated. Such benefits may generally be referred to herein as "post-play benefits". Such "post-play" benefits may typically require that the player play at the gaming device prior to qualifying for and/or receiving a benefit. In some embodiments however, the player may otherwise become "invested" in and/or receive benefits associated with a gaming device and/or associated with one or more other players.

Post-play benefits may generally be earned and/or awarded based on at least one of (i) a prequalification condition, (ii) a triggering condition, and/or (iii) a reward condition. A player may fail to win a certain amount at a gaming device (e.g., a prequalification condition), for example, and move on to another gaming device. According to some embodiments, if a second player initiates play at the first player's original gaming device within a certain period of time (e.g., a triggering condition) and/or the second player manages to win a certain amount at the first player's original gaming device, then the first player may receive a post-play benefit (e.g., via the current gaming device utilized by the first player and/or via other means). In such a manner, for example, the first player may feel that time spent at a gaming device has earned the first player a stake in future outcomes of the gaming device, and indeed it may. Because the first player may experience such a feeling of "investment", the first player may be more likely to continue play at a machine even while experiencing losses, and/or may be more likely to play at other machines and/or games even after losing (and/or not winning) at the original machine. In some embodiments, additional conditions may be required prior to the first player's redemption and/or receipt of a reward or benefit (e.g., a reward condition).

With these and other advantages and features of embodiments that will become hereinafter apparent, the nature of various embodiments may be more clearly understood by reference to the following detailed description, to the appended claims, and to the figures referenced herein.

II. General Process

In some embodiments, a player may generally qualify and/or register for the opportunity to receive post-play benefits associated with a gaming device. The player may spend a certain amount of money at the gaming device (e.g., a "prequalification condition"), for example, to qualify for post-play benefits. Then, in some embodiments, the player may terminate play at the gaming device (and may or may not continue play at a different device and/or game). According to some embodiments, if a "triggering condition" is then satisfied, the player may receive a post-play benefit. If another player wins a certain amount at the gaming device (e.g., after the original player leaves the gaming device), for example, the original player may receive a post-play benefit so that the original player does not experience negative feelings such as jealousy (and indeed may experience positive feelings) associated with the gaming device and/or so that such negative feelings may be minimized. Various embodiments may be practiced to effectuate these and other desirable results.

Referring initially FIG. 1, for example, a flow diagram of a method 100 according to some embodiments is shown. In some embodiments, a controller, a gaming device, another device, and/or any combination thereof may perform and/or be associated with the method 100. The method 100 may be performed by a slot and/or video poker machine, for example, or a peripheral device or server in communication therewith. The flow diagrams described herein do not necessarily imply a fixed order to the actions, and embodiments may be performed in any order that is or becomes practicable. It should be noted that the methods herein may be performed by hardware, software (including microcode), firmware, and/or any combination thereof. For example, a storage medium may store thereon instructions that when executed by a machine result in performance according to any of the embodiments described herein.

In some embodiments (such as shown in FIG. 1), the method 100 may begin by determining whether a first condition associated with a first player of a gaming device is satisfied, at 102. The first condition may, for example, comprise a prequalification condition associated with post-play benefits. In other words, the first condition may be a condition that the first player must satisfy in order to qualify for, register for, and/or otherwise become eligible for post-play benefits. In some embodiments, the first condition may be associated with (i) actions and/or omissions of the first player, (ii) actions and/or omissions of a second player, and/or (iii) external events (e.g., actions or events not directly attributable to and/or associated with a player).

According to some embodiments, such as in the case that the first condition is associated with actions and/or omissions of the first player, the first condition may be associated with actions and/or omissions of the first player at a first and/or second gaming device. In other words, the first player may qualify for (or be determined to be qualified for) post-play benefits based on actions of the first player at a first gaming device, a second gaming device, and/or a combination thereof. For example, the first player may initiate play at a first gaming device to qualify for post-play benefits. In some embodiments, simply the initiation of play at the first gaming device may qualify the first player for the post-play benefits. The first condition may comprise, for example, a requirement that the first player (i) play at a specific gaming device (e.g., the first gaming device), (ii) play at a gaming device of a specific manufacturer, and/or (iii) play one or more specific games at a gaming device.

According to some embodiments, the first condition may also or alternatively comprise a requirement that the first player (i) establish a certain credit balance at the first gaming device (e.g., a twenty-dollar ($20) balance), (ii) play for a certain time period at the first gaming device (e.g., fifteen minutes (15-min) and/or thirty-minutes (30-min) pursuant to a time-play product), (iii) purchase and/or initiate a certain number of outcomes at the first gaming device (e.g., fifty (50) handle pulls of a slot machine and/or two-hundred (200) hands of a video poker game pursuant to a bulk-play product), (iv) purchase and/or initiate a certain number of outcomes at the first gaming device within a certain period of time (e.g., one hundred (100) slot machine spins within one hour (1-hr); i.e., achieving a certain rate of play), (v) wager a certain amount of money at the first gaming device (e.g., committing to a wager greater than or equal to one hundred dollars ($100)), (vi) wager a certain amount of money at the first gaming device within a certain period of time (e.g., wager fifty dollars ($50) within the course of a day), (vii) win a certain amount of money at the first gaming device, (viii) win a certain amount of money at the first gaming device within a certain period of time, (ix) not win a certain amount of money at the first gaming device (e.g., not win twenty-five dollars ($25), which may be a pre-selected amount determined by the first player, the gaming device, a peripheral device, and/or a server), (x) not win a certain amount of money at the first gaming device within a certain period of time, (xi) lose a certain amount of money at the first gaming device, (xii) lose a certain amount of money at the first gaming device within in a certain period of time, (xiii) obtain a certain outcome at the first gaming device (e.g., Lemon-Lemon-Cherry, a bonus round triggering outcome, and/or an outcome custom selected by the first player), (xiv) obtain a certain outcome at the first gaming device within a certain period of time, (xv) not obtain a certain outcome at the gaming device (e.g., Jackpot-Jackpot-Jackpot) or outcomes (e.g., a "cold streak"), (xvi) not obtain a certain outcome or outcomes at the gaming device within a certain period of time (e.g., a "cold streak" that lasts for more than fifteen minutes (15-min)), (xvii) obtain a certain number of losing outcomes in a row, and/or (xviii) not get into a bonus round.

In some embodiments, the first condition may be associated with other interactions of the first player with the first gaming device. The first condition may comprise, for example, a requirement that the first player utilize a player tracking card to play at the first gaming device and/or earn a certain number of complimentary ("comp") points via the first gaming device. Similarly, the first condition may be associated with actions of the first player that are not necessarily performed via the first gaming device (and/or solely vie the first gaming device). Such actions may comprise, for example, the first player (i) signing up for a player tracking card and/or account, (ii) purchasing and/or signing up for a premium level player account, (iii) registering at a hotel and/or casino property (e.g., making a reservation at a hotel-casino and/or checking into the hotel-casino), (iv) making a purchase at a hotel, casino, and/or retail store (e.g., making a purchase at a hotel gift shop, eating at a casino restaurant, and/or purchasing gas at a particular gas station), and/or (v) signing up for and/or make a purchase with a particular credit and/or debit account (e.g., sign up for and/or use a co-branded and/or private label credit card associated with the casino, gaming device manufacturer, and/or other sponsor).

According to some embodiments, the first condition may comprise a requirement that events at least partially external to the first gaming device occur. In other words, the first condition may be associated with a particular time of day, day of the week, etc. (e.g., players may be qualified for post-play benefits during periods of expected and/or actual low foot traffic and/or low gaming device utilization rates, on a player's birthday, and/or on the last day of a player's vacation) and/or with the occurrence and/or particular resolution of a specific event (such as a sporting event outcome, etc.). In some embodiments, a conditional event may be associated with other gaming devices and/or games. The first player may earn a certain number of comp points due to play at any of a variety of gaming devices and/or games of a casino to satisfy the first condition, for example, and/or may complete a "scavenger hunt"-style requirement.

In order to satisfy the first condition, for example, the first player may be required to play at a certain number, type, and/or order of gaming devices and/or achieve certain values of play parameters (e.g., balances, winnings, outcomes, and/or durations) at various gaming devices. In such a manner, for example, the first player may be required to complete gaming actions that increase traffic at under-utilized gaming devices, introduce the first player to a new gaming device and/or type, and/or otherwise desirably direct play of the first player. To promote foot traffic and/or exposure of areas of a casino floor, for example, the first player may be provided with a map, clues, and/or other indications directing the first player to play at various gaming devices on the casino floor. Advantages and applications of such a "scavenger hunt" are described in U.S. Pat. No. 6,364,765 entitled "ELECTRONIC AMUSEMENT DEVICE OFFERING SECONDARY GAME OF CHANCE AND METHOD FOR OPERATING SAME", filed on Jul. 1, 1998 in the name of Walker et. al, and issued on Apr. 2, 2002, the scavenger-hunt-type concepts and descriptions of which are hereby incorporated by reference herein.

In some embodiments, the first condition may simply comprise the registering of the first player for post-play benefit opportunities. The first player may interface with a customer service representative (e.g., at a customer service desk), a kiosk, a website, an Interactive Voice Response Unit (IVRU), the first gaming device, another device (e.g., a peripheral device), and/or any combination thereof, for example, to register for post-play benefits. In some embodiments, registering may comprise paying a fee (e.g., a post-play benefits registration fee) or providing another form of consideration (e.g., agreeing to perform an activity), securing an amount of funds via a credit card, and/or redeeming an amount of comp points. According to some embodiments, only preferred players, such as players that have purchased tickets to a casino show, registered guests of a hotel-casino, high-value players (e.g., player deemed to be of a certain value, based on their play history, to the casino), and/or other Very Important People (VIP) may be able to register for and/or receive post-play benefits (e.g., as an incentive and/or reward in itself).

In the case that the first condition is determined to be satisfied (and/or complied with), the first player may be deemed to be qualified for and/or registered for post-play benefits. In some embodiments, such a qualification and/or registration may be associated specifically with the first gaming device and/or may be associated with a particular duration (e.g., the first player is qualified and/or registered for one day, week, or year, and/or for up to two gaming devices). In the case that the first condition is determined not to be satisfied, the first player may be deemed to be unqualified and/or unregistered for post-play benefits, and, in some embodiments, the method 100 may simply end (and/or play at the first gaming device and/or other gaming devices may progress normally).

Regardless of how (and/or whether) the first player prequalifies and/or registers for post-play benefits pursuant to satisfaction of the first condition, the method 100 may continue, according to some embodiments, at 104 by determining whether a second condition associated with a second player of the gaming device is satisfied. In some embodiments, the determination of the second condition may generally occur after the determination of the first condition, and/or the event (or events) associated with the second condition may occur after the event (or events) associated with the first condition. For example, the first player may qualify and/or register for post-play benefits at the first gaming device (at 102) and, after playing at the first gaming device, may terminate such play (and/or move on to another gaming device, go eat dinner, etc.). The second player may then, for example, initiate play at the gaming device and/or trigger an event that satisfies the second condition. The individual determinations (e.g., at 102, 104) may be made (i) substantially as each triggering event (or events) is detected or determined, (ii) substantially upon the occurrence of an event (or events) that satisfy the second condition, (iii) on a continuous and/or substantially continuous manner (e.g., a server may continuously or substantially continuously monitor an operation of a gaming device to make one or more of the determinations 102 and 104), and/or (iv) at pre-determined intervals (e.g., every hour and/or every one hundred (100) plays, spins, or hands).

The second condition may generally comprise any requirement similar to the requirements noted with respect to the first condition herein, except that the requirements of the second condition may generally be applied to the second player. In other words, the second condition may be associated with a requirement that the second player (i) play at a specific gaming device (e.g., the first gaming device and/or another gaming device previously played by the first player), (ii) play at a gaming device of a specific manufacturer, and/or (iii) play one or more specific games at a gaming device. In some embodiments, the second player may be required to initiate play at the first gaming device (and/or another gaming device) during a certain time period, such as within one hour (1-hr) of the first player's termination of play at the first gaming device.

According to some embodiments, the second condition may also or alternatively comprise a requirement that the second player (i) establish a certain credit balance at the first gaming device, (ii) play for a certain time period at the first gaming device, (iii) purchase and/or initiate a certain number of outcomes at the first gaming device, (iv) purchase and/or initiate a certain number of outcomes at the first gaming device within a certain period of time, (v) wager a certain amount of money at the first gaming device, (vi) wager a certain amount of money at the first gaming device within a certain period of time, (vii) win a certain amount of money at the first gaming device, (viii) win a certain amount of money at the first gaming device within a certain period of time, (ix) not win a certain amount of money at the first gaming device, (x) not win a certain amount of money at the first gaming device within a certain period of time, (xi) lose a certain amount of money at the first gaming device, (xii) lose a certain amount of money at the first gaming device within in a certain period of time, (xiii) obtain a certain outcome at the first gaming device, (xiv) obtain a certain outcome at the first gaming device within a certain period of time, (xv) not obtain a certain outcome at the gaming device or outcomes, and/or (xvi) not obtain a certain outcome or outcomes at the gaming device within a certain period of time.

In some embodiments, the particular requirements (and/or portions thereof) associated with the second condition may be determined, defined, and/or selected by the first player. Upon qualifying and/or registering for post-play benefits (e.g., at 102), for example, the first player may be presented with a menu from which the first player may select a particular outcome that the second player must obtain (or not obtain) in order for the first player to receive a post-play benefit associated with the first gaming device. In some embodiments, such as in the case that the first player must pay a fee for the opportunity to receive post-play benefits, the fee may be based at least in part on the requirements selected by the first player. For example, if the first player designates an outcome, the obtaining of which by the second player is to trigger a post-play benefit, the post-play registration fee (and/or required prequalification event) may be based upon the probability of the second player obtaining the specified outcome.

According to some embodiments, the second player may comprise a plurality of players. The second condition may be satisfied, for example, in the case that a particular outcome is obtained at the first gaming device by any or all of three (3) players that play at the first gaming device subsequent to the first player. Fewer or more subsequent players are similarly contemplated. In some embodiments, the subsequent players may be required to achieve a series of outcomes to satisfy the second condition. In the case of video poker, for example, the subsequent players of the first gaming device may be required to collectively (although generally not simultaneously) obtain a set of hands such a royal flush, three of a kind, and a full house. In the case that any combination of the subsequent players obtains the three (3) specified hands of the set (e.g., one subsequent player could obtain the full house and a second subsequent player could obtain the royal flush and the three of a kind), the second condition may be determined to be satisfied.

In some embodiments, in the case that the second condition is determined to be satisfied, post-play benefits may be deemed available to the first player. The satisfaction of the second condition may, in other words, trigger the availability of a post-play benefit. Alternatively, in the case that the second condition is determined not to be satisfied, post-play benefits may be deemed currently unavailable to the first player. In some embodiments, the determination of whether the second condition is satisfied may be made repeatedly, such as during intervals within a time period. The time period may comprise, for example, a time period associated with the first player's eligibility for post-play benefits, such as within one hour after the first player terminates play at the first gaming device.

According to some embodiments, the method 100 may continue at 106 by awarding, in the case that both the first and second conditions are determined to be satisfied, a benefit to the first player (or causing an award to be awarded to the first player, such as by directing a device to award the benefit). In other words, in some embodiments where the first player is determined to be qualified for post-play benefits and one or more triggering conditions is satisfied to make post-play benefits available, such benefits may be conferred upon the first player. Post-play benefits may comprise any number of rewards, incentives, discounts, services, products, and/or other compensation and may be provided to the first player via various means and/or methods. In the case that the first player has moved on to a second gaming device, for example, the post-play benefits may be provided via the second gaming device to the first player. Similarly, the first player (and/or the second player) may be notified of the awarded benefits via one or more of the first and second gaming devices, personal devices, and/or a loud speaker, display device, or customer service representative, waitress, etc. In some embodiments, the post-play benefits may be credited to an account associated with the first player (e.g., a player tracking account, hotel or room account, and/or a bank or credit card account), mailed or e-mailed to the first player, and/or provided to the first player via a representative of the casino (e.g., who locates the first player on the casino floor, in a hotel, and/or who holds the award—or access thereto—at a customer service desk until the first player arrives to redeem and/or receive the awarded benefits).

According to some embodiments, post-play benefits may comprise one or more of any type or configuration of benefit that is or becomes known or practicable. Post-play benefits may comprise, for example, at least one of:

(i) a flat monetary amount (e.g., a certain, fixed amount of money such as a twenty-five dollar ($25) jackpot amount). In some embodiments, the first player may receive a flat monetary amount equal to an amount of "buy-in" that the first player provided to the gaming device. In other words, the first player may get back whatever amount the player tendered to the machine;

(ii) a tiered monetary amount (e.g., different triggering conditions may yield, as post-play benefits, different flat amounts. For example, if a second player wins, at a first gaming device, an amount between one hundred dollars ($100) and two hundred dollars ($200), the first player may win, as a post-play benefit, fifty dollars ($50), while if the second player wins, at the first gaming device, an amount between two hundred and one dollars ($201) and three hundred dollars ($300), the first player may win, as a post-play benefit, seventy-five dollars ($75));

(iii) a declining monetary amount (e.g., the farther the first player is geographically from the first gaming device at the time of the triggering condition, the less money the first player will receive as a post-play benefit. Or, the more time that elapses between the first player's last wager at a first gaming device and the occurrence of a subsequent triggering condition, the less money the first player will receive as a post-play benefit. Or, the more time that elapses between the occurrence of a prequalification condition and a subsequent triggering condition, the less money the first player will receive as a post-play benefit);

(iv) a percentage of payouts (e.g., a first player may receive, as a post-play benefit, a percentage of a second player's winnings; it should be noted that any percentage of payouts described herein may be generally associated with a second player or may be associated with a second player's payouts from a certain gaming device or devices, such as from the first gaming device). In some embodiments, the second player's payout and/or winnings may be split between the first and second players according to the percentage of post-play benefits awarded, while in some embodiments, the second player takes the full payout and/or winnings and the first player receives an additional percentage based on the payout and/or winnings;

(v) a tiered percentage of payouts (e.g., percentages differ based on the amount of a second player's winnings. For example, a first player may receive, as a post-play benefit, (a) twenty-five percent (25%) of any amount that is won by the second player that is less than one hundred dollars ($100), (b) thirty percent (30%) of any amount between one hundred and one dollars ($101) and one hundred and twenty-five dollars ($125) won by the second player, and (c) thirty-five percent (35%) of any amount between one hundred and twenty-six dollars ($126) and one hundred and fifty dollars ($150) won by the second player);

(vi) a declining percentage of payouts (e.g., percentages may decline based on the distance between the first player and the first gaming device at the time of a triggering condition. If the first player is playing a second gaming device that is adjacent to the first gaming device at the time the triggering condition is satisfied, for example, the first player may win fifty percent (50%) of the second player's winnings. However, if the first player is playing at a second gaming device that is not within the same bank of devices as the first gaming device, the first player may only receive twenty-five percent (25%) of the second player's winnings. Percentages may also or alternatively decline based on the time elapsed between (1) the first player's last wager at the first gaming device or the occurrence of the prequalification condition, and (2) the triggering condition);

(vii) more than one post-play benefit payout (e.g., different triggering events may trigger different payout amounts, and so a first player may receive more than one post-play benefit payout in a given period of time);

(viii) a portion of a second player's net winnings (e.g., in a sense, a first player may have a "lien" on the winnings of a subsequent player or on a gaming device having subsequent player—such as for a certain period of time. For example, for ten minutes (10-min) following the first player's last wager at a first gaming device, any subsequent player who plays at the first gaming device must forfeit five percent (5%) of net winnings to the first player. In some embodiments, a message and/or other indication may be provided to the subsequent players to alert them to the fact that the first gaming device is associated with a "lien" by the first player—such as via a count-down timer showing how much longer the gaming device will be subject to the "lien" and/or an indication of how much of any payout is subject to the "lien");

(ix) a payout probability change (e.g., a second gaming device played by the first player may temporarily change from a seventy-five percent (75%) payback machine to an eighty-five percent (85%) payback machine upon the occurrence of a triggering condition);

(x) a number of credits (e.g., one or more credits added to a credit balance of a second gaming device played by the first player);

(xi) a number of free spins and/or additional flat-rate play time (e.g., at a second gaming device played by the first player and/or at the first gaming device);

(xii) a particular outcome or portion thereof (e.g., a first player may get an automatic "head start" towards a certain outcome at a second gaming device. Such a head start may comprise, for example, two bar symbols on a three or five-reel slot machine and/or three cards towards a royal flush at a video poker machine);

(xiii) a bonus round (e.g., the ability to participate in a bonus round, such as the bonus round of a slot machine);

(xiv) an interface with a bonus device (e.g., a spin of a bonus reel);

(xv) a comp or number of comp points (e.g., a free drink or a number of comp points recorded in a database record corresponding to the first player's player tracking card identifier);

(xvi) a coupon, discount, rebate, or the like (e.g., a discount and/or rebate for purchases at on-property vendors or other affiliated vendors);

(xvii) a number of downloads (e.g., the ability to download, such as from a gaming device or kiosk to a personal device such as a Personal Digital Assistant (PDA), a Personal Computer (PC), a cell phone, or an Ipodg, digital files such as ring tones, music files, etc.);

(xviii) an available jackpot or jackpot size (e.g., the ability of a first player to win a jackpot of the size that a second player is eligible for, or actually won—such as even in the case that a second gaming device played by the first player does not typically allow such a jackpot);

(xix) a wager rebate (e.g., a rebate of a previous wager such as a wager made at the first gaming device); or (xx) network access (e.g., the ability to utilize a communications network, such as a telephone network—such as for free long-distance phone calls, Internet or wireless access, etc.).

In some embodiments, the geographic position of the first player may be utilized to determine the satisfaction of a condition and/or to determine the nature and/or magnitude of an available post-play benefit. As described herein, for example, the first player may earn larger post-play benefits the nearer the first player is located to the first gaming device when the post-play benefits become available (e.g., upon the occurrence and/or determination of the occurrence of one or more events satisfying the second condition). Similarly, the post-play benefits may be determined based on how close the first player is to a particular location, such as a show or presentation, or may be at least partially based upon historical movements of the first player (or patterns thereof) throughout the casino floor and/or hotel).

The geographic position of the first player may be determined and/or estimated in any number of ways that are or become known or practicable. For example, the first player's position or location may be determined based upon (i) which machine the first player is playing at (e.g., via player tracking card technology), (ii) whether the first player is logging onto a casino website from a remote computer, (iii) where the first player's cell phone is geographically located via cell tower triangulation methods and/or Global Positioning System (GPS) coordinates, and/or (iv) whether the first player has checked out of a casino's hotel.

According to some embodiments, the method 100 may also or additionally comprise other processes related to the awarding of post-play benefits to the first player. For example, in some embodiments at least one outcome of the first gaming device may be provided to the first player. The first player may, for example, initiate and/or complete a session of play at the first gaming device. Similarly, the first player's session of play may also or alternatively be terminated. According to some embodiments, such as in the case that post-play benefits indeed define benefits provided to the first player after play at the first gaming device has terminated, the awarding may take place after the termination of play.

In some embodiments, one or more data records and/or other information may be populated and/or updated in response to the determinations of whether the first and/or second conditions are satisfied. Records stored in a database, such as those described elsewhere herein for example, may store indications of the determinations. Similarly, information associated with an available and/or triggered post-play benefit may be stored, populated, and/or updated. Data stores, databases, files, and/or other data structures or information may be stored locally (e.g., at a gaming device) and/or may be stored remotely (e.g., at a gaming server, controller, and/or data repository). According to some embodiments, such as in the case that post-play benefits are provided via a gaming device and/or peripheral device, a signal may be generated that instructs such a device to dispense and/or otherwise provide an appropriate benefit.

According to some embodiments, one or more additional and/or reward conditions may also or alternatively exist. Even after a player qualifies for post-play benefits and such benefits become triggered, for example, an additional requirement may need to be satisfied prior to the player being allowed to redeem and/or receive a benefit (e.g., a reward condition). The player may be required to come back to a casino in one week, or on a certain date, for example, or may be required to satisfy one or more other conditions such as playing at a certain gaming device, playing a certain type of game, etc. In some embodiments, either or both of the prequalification conditions and the triggering conditions may also or alternatively comprise multiple conditions. As described herein, for example, a player may be required to play at several different gaming devices and/or a second player may be required both to obtain a specific outcome and do so within a particular time frame. In some embodiments, the value and/or cost of a post-play benefit may be at least partially based upon the number, type, and/or difficulty associated with required conditions.

III. System Architecture

Figure 2:
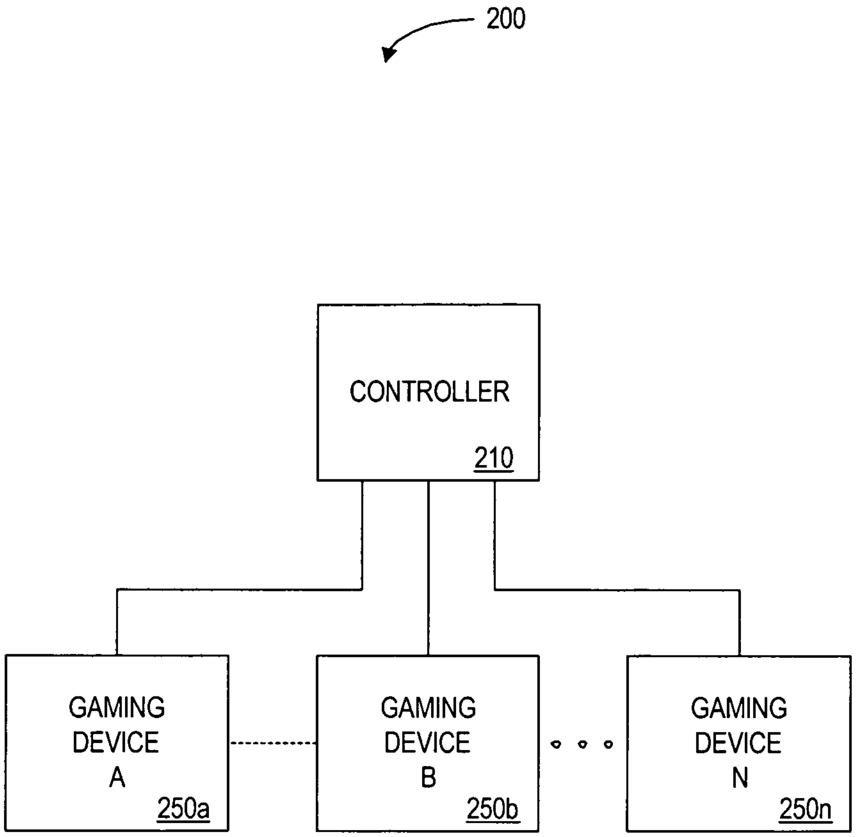
FIG. 2 is a block diagram of a system according to some embodiments.

Referring now to FIG. 2, a block diagram of a system 200 according to some embodiments is shown. In some embodiments, the system 200 may be configured to perform and/or may be otherwise associated with the method 100 described in conjunction with FIG. 1. The system 200 may comprise, for example, a controller 210 (e.g., a slot server of a casino) that is in communication, via a communications network (not explicitly shown), with one or more gaming devices 210*a-n*

(e.g., slot machines and/or video poker machines). The controller 210 may generally communicate with any or all of the gaming devices 250*a-n* directly or indirectly, via a wired or wireless medium, a combination of networks, or via any appropriate communications means or combination of communications means that is or becomes known or practicable. The gaming devices 250*a-n* and/or the controller 210 may communicate, for example, through a Web site maintained by computers on a remote server or over an on-line data network including commercial on-line service providers, bulletin board systems and the like. Each of the gaming devices 250*a-n* may generally comprise computers, such as those based on the Intel® Pentium® processor, that are adapted to communicate with the controller 210. Any number, type, configuration, and/or number of types of gaming devices 250*a-n* may be in communication with the controller 210. In some embodiments, fewer or more controllers 210 and/or gaming devices 250*a-n* may be provided in the system 200.

Some, but not all, possible communication networks that may comprise the network or be otherwise part of the system 200 include: a Local Area Network (LAN), a Wide Area Network (WAN), the Internet, a telephone line, a cable line, a radio channel, an optical communications line, and/or a satellite communications link. Possible communications protocols that may be part of the system 200 may include, for example: Ethernet (or IEEE 802.3), SAP, ATP, Bluetooth , and/or TCP/IP. Further, in some embodiments, various communications protocols endorsed by the Gaming Standards Association (GSA) of Fremont, Calif., may be utilized, such as (i) the Gaming Device Standard (GDS), which may facilitate communication between a gaming device and various component devices and/or peripheral devices (e.g., printers and/or bill acceptors), (ii) the Best of Breed (BOB) standard, which may facilitate communication between a gaming device and various servers related to play of one or more gaming devices (e.g., servers that assist in providing accounting, player tracking, content management, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art, and/or may be encoded or compressed as is or becomes desirable.

In some embodiments, a controller 210 may not be necessary and/or preferred within the system 200. For example, one or more embodiments may be practiced on a stand-alone gaming device 250*n* and/or a first gaming device 250*a* in communication with a second gaming device 250*b* (i.e., without a controller 210). In such embodiments, any functions described herein as being performed by the controller 210 or data described as stored on or by the controller 210 may instead be performed by or stored on the one or more gaming devices 250*a-n*.

In one embodiment, the controller 210 may be operable, via the network, to (i) configure (or reconfigure) any or all of the gaming devices 250*a-n* remotely, (ii) update software stored on any or all of the gaming devices 250*a-n* and/or (iii) download software and/or software components to any or all of the gaming devices 250*a-n*. For example, a database (e.g., a payout or probability database) stored in the memory of gaming device 250*a* may be altered, modified, or updated remotely, hot fixes may be applied to software stored by the gaming device 250*a*, and/or new versions of software may be downloaded to the gaming device 250*a*. Similarly, any or all of the gaming device 250*a-n* may be programmed to retrieve any or all such updates or information from another device.

In one embodiment, controller 210 may be programmed to perform any or all of the above functions based on, for example, an occurrence of an event (e.g., a scheduled event), a satisfaction of a condition, receiving an indication from a qualified casino employee and/or other person (e.g., a regulator) and/or receiving a request from a player.

In one embodiment, any or all of the gaming devices 250*a-n* may be operable to facilitate downloadable games such that games available for play on a gaming device may be stored on a server device (e.g., the controller 210) and downloaded to the gaming device. In one embodiment, software components of the gaming device may be remotely modified and/or updated by another device (e.g., the controller 210). For example, a payout or probability table stored in the memory of gaming device may be altered, modified or updated remotely, hot fixes may be applied to software stored by the gaming device and/or new versions of software may be downloaded to the gaming device. Similarly, the gaming device may be programmed to retrieve any or all such updates or information from another device, as appropriate and preferred. Any of the above (e.g., downloading of a game, updating of software, modification of a payout or probability table) may occur, for example, based upon an occurrence of an event (e.g., a scheduled event), a satisfaction of a condition, an indication being received from qualified casino personnel or other entity (e.g., a regulator), and/or upon a request from a player. In one embodiment, any or all of the gaming devices 250*a-n* may comprise a thin client device controlled be a server device (e.g., the controller 210).

In one or more embodiments, the system 200 may include additional devices (not shown), such as one or more casino personnel devices, one or more additional servers (e.g., a hotel reservation server, an audio or video server, a benefits or rewards server, and/or an inventory management server). In accordance with one embodiment, a benefits or rewards server may comprise, for example, a server storing information regarding post-play and/or regular benefits available to players within a casino (or multiple casinos). Of course, such information may also be stored at controller 215, as described herein. One or more Point-Of-Sale (POS) terminals (not shown) associated with one or more merchants (also not shown) may also or alternatively be included in the system 200.

In some embodiments, various casino employees may be equipped with or otherwise utilize one or more casino personnel devices (not shown), such as PDA devices or other computing devices (e.g., PC terminals). A casino personnel device may comprise various input devices (e.g., a keypad, a touch-sensitive display screen, a card reader, and/or an infrared bar code scanner), various output devices (e.g., a Liquid-Crystal Display (LCD) screen), a processor, a memory and/or a communications port, as described herein with respect to other devices. In some embodiments, a casino personnel device may communicate with a gaming device 250*a-n*, server or controller 210, kiosk, peripheral device, and/or an inventory/reservation system of a casino-maintained property (e.g., a hotel). Thus, a casino personnel device may be configurable to, among other things, (i) read from and/or write to one or more databases, (ii) assist in payments made to players (e.g., a representative "scans" a cashless gaming receipt and determines a value associated with the receipt, and if the receipt is valid, provides payment equal to the value), (iii) assist in payment made by players (e.g., a casino representative may receive a payment from a player for a post-play benefit fee), (iv) assist in registering players for a post-play benefit, and/or (iii) execute or assist in the execution of various other processes described herein.

For example, a casino employee may utilize a casino personnel device to (i) obtain, display and/or view information about available post-play benefits, (ii) register the player for the post-play benefits, and/or (iii) receive a payment or means of payment (e.g., a credit or debit card number) from a player in exchange for an opportunity for the player to receive post-play benefits. In one or more embodiments, a memory of a casino personnel device may store one or more programs for executing processes described herein, or portions thereof.

In some embodiments, various merchants (e.g., shops and/or restaurants) may utilize POS computer terminals to facilitate various processes described herein. For example, in some embodiments, a player may win, earn or otherwise qualify to receive post-play benefits by making purchases at a merchant. In another example, a player may register at a merchant to qualify for the opportunity to receive post-play benefits. Thus, in some embodiments, merchants may utilize POS terminals to (i) determine a player's eligibility to receive post-play benefits, (ii) transmit a player's eligibility to receive post-play benefits, (iii) register a player to receive post-play benefits, and/or (iv) receive a payment from a player for the opportunity to receive post-play benefits.

In some embodiments, POS terminals may be configured to read from and/or write to one or more databases. Such POS terminals may thus comprise various hardware and software described herein with respect to other devices, and may communicate with (i) a casino server or the controller 210, (ii) a gaming device 250*a-n*, (iii) an inventory/reservation system (e.g., a computer terminal at a theatre communicates with an inventory database to determine a number of unsold seats for a certain event), and so on.

In some embodiments, various component devices (e.g., any or all of the post-play benefit output devices, output devices, input devices, and/or input-output devices described herein) may be embodied as peripheral devices. For example, such devices may not necessarily be components of a gaming device 250*a-n*, though they may be configured in such a manner so as to communicate with one or more gaming device processors or any other devices described herein. For example, a peripheral device such as a large display device may be associated with a plurality of gaming devices 250*a-n*, and thus may not necessarily be considered a component of any one gaming device 250*a*.

Further, in some embodiments, certain peripheral devices such as card readers may be interchangeable between gaming devices 250*a-n*, and thus may be considered a component of a first gaming device 250*a* while connected thereto, removed from the first gaming device 250*a*, connected to a second gaming device 250*b*, and so on. In other embodiments, various peripheral devices may never be considered a component of a particular gaming device 250*a-n*. For example, in some embodiments, a peripheral device such as a Universal Serial Bus (USB)-based portable memory device may store (i) one or more databases, such as the databases described herein, and/or (ii) a program for executing one or more processes, such as the processes described herein. Such a peripheral device may then be utilized by casino personnel for upgrading/retrofitting existing gaming devices 250*a-n*, as described herein.

IV. Device Architectures

Figure 3:
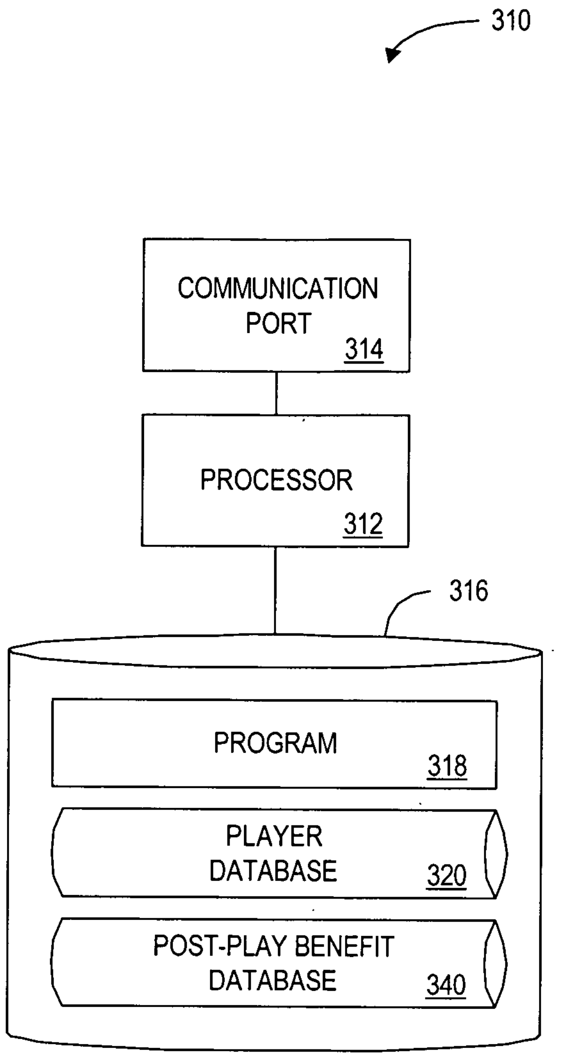
FIG. 3 is block diagram of a controller according to some embodiments.

Referring now to FIG. 3, a block diagram of a controller 310 according to some embodiments is shown. In some embodiments, the controller 310 may be configured to perform and/or may be otherwise associated with the method 100 described in conjunction with FIG. 1. The controller 310 may be similar in configuration and/or functionality, for example, to the controller 210 described in conjunction with FIG. 2. In some embodiments, the controller 310 may be implemented as a system controller, a dedicated hardware circuit, an appropriately programmed general-purpose computer, and/or any other equivalent electronic, mechanical or electromechanical device. The controller 310 may comprise, for example, a server computer operable to communicate with one or more client devices, such as one or more gaming devices (e.g., the gaming devices 250*a-n*described in conjunction with FIG. 2), one or more kiosks, one or more peripheral devices, and/or one or more casino personnel devices. The controller 310 may, according to some embodiments, be operative to manage the system 100 of FIG. 1 to execute some or all of the methods (such as the method 100 of FIG. 1) described herein.

In operation, the controller 310 may generally function under the control of a casino, another merchant, and/or other entity that may also control use of the gaming devices 250*a-n* of FIG. 2. For example, the controller 310 may be a slot server in a casino. In some embodiments, the controller 310 and a slot server may be different devices. In some embodiments, the controller 310 may comprise a plurality of computers operating together. In some embodiments, the controller 310 and a gaming device may be the same device.

The controller 310 may, according to some embodiments, comprise a processor 312, such as one or more Intel& Pentium® processors. The processor 312 may be in communication with a communication port 314 (e.g., for communicating with one or more other devices, such as the one or more gaming devices 250*a-n* of FIG. 2), and a memory 316. The memory 316 may comprise an appropriate combination of magnetic, optical, and/or semiconductor memory, and may include, for example, Random Access Memory (RAM), Read-Only Memory (ROM), a compact disc, and/or a hard disk. The processor 312 and the memory 316 may each be, for example: (i) located entirely within a single computer or other device, or (ii) coupled to each other by a remote communication medium, such as a serial port cable, telephone line, or radio frequency transceiver. In one embodiment, the controller 310 may comprise one or more devices that are connected to a remote server computer for maintaining databases.

The memory 316 may generally store a program 318 for controlling the processor 312. The processor 312 may perform instructions of the program 318, for example, and thereby operate in accordance with embodiments described herein. The program 318 may be stored in a compressed, un-compiled, and/or encrypted format. The program 318 may also or additionally include program elements that may be necessary, such as an operating system, a database management system, and/or "device drivers" for allowing the processor 312 to interface with computer peripheral devices. The program 318 may, according to some embodiments, include computer program code that allows the controller 310 to employ the communication port 314 to communicate with a gaming device (e.g., the gaming devices 250*a-n* of FIG. 2) in order to, for example:

1. track gambling activity performed at the gaming device;
2. track gaming activities of individual players;
3. track gaming session activities at the gaming device;
4. determine whether post-play benefits have been activated and/or are available at a gaming device;
5. determine whether a player qualifies for post-play benefits associated with a gaming device;

6. determine whether a player has registered for post-play benefits at a gaming device;
7. instruct a gaming device to perform one or more functions (e.g., output a specific post-play benefit and/or notification thereof.);
8. determine whether a player has provided a selection of available post-play benefits; determine a location of a player;
9. determine whether a player has provided a payment in exchange for the opportunity to receive post-play benefits; and/or
10. manage play or other operation of the gaming device (e.g., by altering a payout percentage, outcome, and/or credit balance in accordance with a post-play benefit).

According to an embodiment, the instructions of the program 318 may be read into a main memory from another computer-readable medium, such as from a ROM to RAM. Execution of sequences of the instructions in program 318 may generally cause the processor 312 to perform the processes described herein. In alternate embodiments, hard-wired circuitry may be used in place of, or in combination with, software instructions for implementation of such processes. Thus, embodiments are not limited to any specific combination of hardware and software.

The memory 316 may also or alternatively store a player database 320 and/or a post-play benefit database 340. In some embodiments (e.g., in an embodiment in which the controller 310 manages downloadable games playable on one or more gaming devices), the memory 316 may store additional databases (not shown). Examples of such additional databases may include, but are not limited to: (i) a gaming device database that stores information related to one or more gaming devices with which the controller 310 is operable to communicate, (ii) a game database that stores information regarding one or more games playable on and/or downloadable to one or more gaming devices, and/or (iii) a scheduling and/or configuration database useful for determining which games are to be made available on which gaming devices.

Similarly, in one embodiment the controller 310 may be operable to configure a gaming device remotely, update software stored on a gaming device, and/or to download software or software components to a gaming device. For example, the controller 310 may be operable to apply a hot fix to software stored on a gaming device, modify a payout and/or probability table stored on a gaming device, and/or transmit a new version of software and/or a software component to a gaming device. The controller 310 may be programmed to perform any or all of the above functions based on, for example, an occurrence of an event (e.g., a scheduled event), receiving an indication from a qualified casino employee, and/or other person (e.g., a regulator), and/or receiving a request and/or indication from a player.

Although the databases 320, 340 are described as being stored in a memory of the controller 310, in other embodiments some or all databases 320, 340 may be partially or wholly stored, in lieu of or in addition to being stored in a memory of the controller 310, in a memory of one or more other devices. Such one or more other devices may comprise, for example, one or more peripheral devices, one or more gaming devices (such as the gaming device 250*a-n* of FIG. 2), a slot server (if different from the controller 310), another device, and/or any combination thereof. Further, some or all of the data described as being stored in the memory 316 may be partially or wholly stored (in addition to or in lieu of being stored in the memory 316) in a memory of one or more other devices. Such one or more other devices may comprise, for example, one or more peripheral devices, one or more gaming devices, a slot server (if different from controller 310), another device, and/or any combination thereof.

Figure 4:
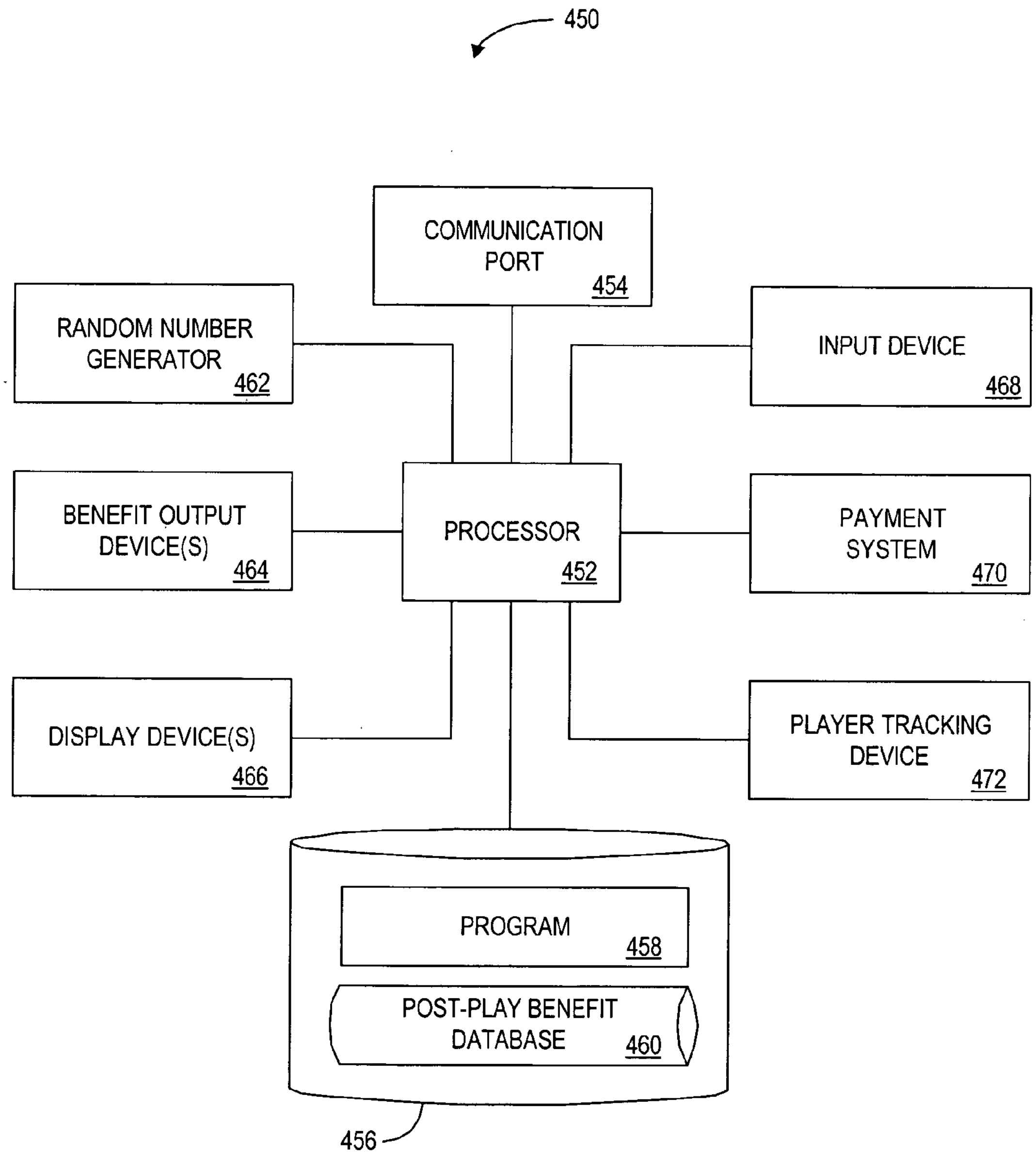
FIG. 4 is a block diagram of a gaming device according to some embodiments.

Referring now to FIG. 4, a block diagram of a gaming device 450 according to some embodiments is shown. In some embodiments, the gaming device 450 may be similar in configuration and/or functionality to the gaming devices 250*a-n* described in conjunction with FIG. 2. The gaming device 450 may, for example, be associated with performing, executing, and/or facilitating the method 100 described in conjunction with FIG. 1.

In some embodiments,. the gaming device 450 may be implemented as a system controller, a dedicated hardware circuit, an appropriately programmed general-purpose computer, and/or any other equivalent electronic, mechanical or electromechanical device. The gaming device 450 may comprise, for example, a slot machine, a video poker terminal, a video blackjack terminal, a video keno terminal, a video lottery terminal, a pachinko machine, and/or a table-top game (e.g., a mechanical or electromechanical device may be associated with a table game and be operable by a player and/or a dealer).

In some embodiments, a gaming device 450 may comprise a PC (e.g., which may communicate with an online casino website), a telephone (e.g., to communicate with an automated sports book that provides gaming services), and/or a portable handheld gaming device (e.g., a PDA, Nintendo™ GameBoy(® or Sony™ PSP®, a dedicated personal handheld gaming device provided by a casino, and/or any combination thereof). In some embodiments, a user device such as a PDA or cell phone (not explicitly shown) may be used in place of, or in addition to, some or all of the components of the gaming device 450. Further, the gaming device 450 may comprise a PC or other device operable to communicate with an online casino and facilitate game play at the online casino. In one or more embodiments, the gaming device 450 may comprise a computing device operable to execute software that simulates play of, for example, a reeled (mechanical or video) slot machine game, video poker game, video blackjack game, video keno game, video roulette game, and/or lottery game. In another embodiment, the gaming device 450 may comprise a hand-held device operable to display the results of a table game, slot machine game, keno game, and/or other game being executed on a casino floor.

In one embodiment, the gaming device 450 may be operable to facilitate downloadable games such that games available for play on the gaming device 450 may be stored on a server device (e.g., the controller 210, 310 or another dedicated device) and downloaded to the gaming device 450. In one embodiment, software components of the gaming device 450 may be remotely modified and/or updated by another device (e.g., the controller 210, 310 or another device). For example, a payout or probability table stored by the gaming device 450 may be altered, modified or updated remotely, hot fixes may be applied to software stored by the gaming device 450, and/or new versions of software may be downloaded to the gaming device 450. Similarly, the gaming device 450 may be programmed to retrieve any or all such updates from another device, as appropriate and/or preferred. Any of the above (e.g., downloading of a game, updating of software, modification of a payout or probability table) may occur, for example, based upon the occurrence of an event (e.g., a scheduled event), an indication being received from qualified casino personnel or other personnel (e.g., a regulator), and/or upon a request from a player. In one embodiment, the gaming device 450 may comprise a thin client device controlled be a server device (e.g., the controller 210, 310 or another dedicated device).

The gaming device 450 may generally comprise a processor 452, such as one or more Intel® Pentium® processors. The processor 452 may generally be in communication with a communications port 454 (e.g., for communicating with one or more other devices, such as the controller 210, 310) and/or a memory 456. The memory 456 may comprise any appropriate combination of magnetic, optical, and/or semiconductor memory, and may include, for example, RAM, ROM, a compact disc, and/or a hard disk. The memory 456 may comprise or include any type of computer-readable medium. The processor 452 and the memory 456 may each be, for example: (i) located entirely within a single computer or other device, or (ii) connected to each other by a remote communication medium, such as a serial port cable, telephone line or radio frequency transceiver. In one embodiment, the gaming device 450 may comprise one or more devices that are connected to a remote server computer for maintaining databases.

The memory 56 may generally store a program 458 for controlling the processor 452. The processor 452 may perform instructions of the program 458, for example, and thereby operate in accordance with embodiments described herein. The program 458 may be stored in a compressed, un-compiled, and/or encrypted format. The program 458 may also or alternatively include program elements that may be necessary and/or desired, such as an operating system, a database management system, and/or "device drivers" for allowing the processor 452 to interface with computer peripheral devices.

According to some embodiments, the instructions of the program 458 may be read into a main memory from another computer-readable medium, such as from a ROM to RAM. Execution of sequences of the instructions in program 458 may cause the processor 452 to perform, for example, some or all of the processes described in conjunction with the method 100 of FIG. 1. In some embodiments, hard-wired circuitry may be used in place of, or in combination with, software instructions for implementation of such processes. Thus, embodiments described herein are not limited to any specific combination of hardware and software.

The memory 456 may also or alternatively store a plurality of databases, such as a post-play benefits database 460. The post-play benefits database 460 may be stored in the memory 456 in tabular form or any other appropriate database or data storage form or structure that is or becomes known or practicable. The data stored therein may include a number of exemplary records or entries, each defining information associated with a potential post-play benefit. It should be understood that the post-play benefits database 460 might include any number of entries. The tabular representation may also define fields for each of the entries or records.

In one or more embodiments, the gaming device 450 may store one or more additional databases (not shown). For example, the gaming device 450 may store a probability database and/or a payout database. The fields of a probability database may specify, for example: (i) a random number (or range of random numbers) that may be generated by a random number generator 462, and/or (ii) an outcome that indicates the one or more indicia comprising the outcome that corresponds to the random number of a particular record. The gaming device 450 may utilize a probability database to determine, for example, what outcome corresponds to a random number generated by the random number generator 462 and to display the determined outcome. The outcomes may comprise the three symbols to be displayed along the payline of a three-reel slot machine, for example. Other arrangements of probability databases are possible. For example, the book "Winning At Slot Machines" by Jim Regan (Carol Publishing Group Edition, 1997) illustrates examples of payout and probability tables and how they may be derived. The payout and probability concepts and descriptions of which are hereby incorporated by reference herein.

The fields of a payout database may specify, for example: (i) an outcome, which indicates the one or more indicia comprising a given outcome, and (ii) a payout that corresponds to each respective outcome. If the gaming device 450 comprises a three-reel slot machine, for example, the outcomes may be those obtained on a three-reel slot machine.

The gaming device 450 may generally utilize a payout database to determine whether a payout should be output to a player as a result of an outcome obtained for a game. For example, after determining the outcome to output on the gaming device, the gaming device may access the payout database to determine whether the outcome for output is one of the outcomes stored as corresponding to a payout. If it is, the gaming device may provide the corresponding payout to the player via a benefit output device. Other arrangements of payout databases are possible.

Although the post-play benefits database 460 is described as being stored in the gaming device 450, in other embodiments the post-play benefits database 460 database (as well as any other database described as being stored in the memory 456) may be partially or wholly stored (in addition to or in lieu of being stored in the gaming device 450) in one or more other devices (not shown in FIG. 4). Such other devices may comprise, for example, (i) one or more peripheral devices, (ii) a peripheral device server, (iii) the controller 210, 310 of FIG. 2 and/or FIG. 3, (iv) another device, and/or (v) a combination thereof. Further, some or all of the data described as being stored in the post-play benefits database 460 and/or in the memory 456 may be partially or wholly stored (in addition to or in lieu of being stored in the gaming device 450) in a memory of one or more other devices. Such devices may comprise, for example, (i) one or more peripheral devices, (ii) a peripheral device server, (iii) the controller 210, 310 of FIG. 2 and/or FIG. 3, (iv) another device, and/or (v) a combination thereof.

In one or more embodiments, the gaming device 450 may be operable to access the data stored on or by these other devices and/or have information associated with the data stored therein downloaded to the gaming device 450 as is necessary and/or appropriate. For example, the gaming device 450 may access a memory of another device to determine the eligibility of a player to receive a post-play benefit and/or information defining the post-play benefit.

In some embodiments, the processor 452 may also or alternatively be operable to communicate with the random number generator 462, which may be a component of the gaming device 450. The random number generator 462, in accordance with at least one embodiment, may generate data representing random or pseudo-random values (referred to as "random numbers" herein). The random number generator may generate a random number every predetermined unit of time (e.g., every second) and/or in response to an event such as an initiation of a game play on the gaming device 450 or receipt of a signal from another device. In the former embodiment, the generated random numbers may be used as they are generated (e.g., the random number generated at substantially the time of game play initiation is used for that game play) and/or stored for future use. A random number generated by the random number generator 462 may be used by the processor 452 to determine, for example, an outcome for a game play, a payout associated with an outcome, and/or which of a plurality of payouts to provide as the result of an outcome.

The random number generator 462, as used herein, may be embodied as a processor separate from, but working in cooperation with, the processor 452. Alternatively, the random number generator 462 may be embodied as an algorithm, program component, micro-engine, and/or software stored in the memory 456 of the gaming device 450 and used to generate a random number.

Note that, although the generation or obtainment of a random number is described herein as involving the random number generator 462 of the gaming device 450, other methods of determining a random number may be employed. For example, an owner or operator of the gaming device 450 may obtain sets of random numbers that have been generated by another entity. HotBitS™, for example, is a service that provides random numbers that have been generated by timing successive pairs of radioactive decays detected by a Geiger-Muller tube interfaced to a computer. In another example, a blower mechanism that uses physical balls with numbers thereon may be used to determine a random number by randomly selecting one of the balls and determining the number thereof.

In yet another example, another device remote from and/or distinct from the gaming device 450 (e.g., the controller 210, 310 of FIG. 2 and/or FIG. 3) may include the random number generator 462 that generates random numbers to be provided to the gaming device 450. For example, in some embodiments, the gaming device 450 may receive random numbers and/or any other data related to the random or pseudo-random determination of an outcome from a separate device, such as a server. It should be noted that such embodiments may be advantageous in environments or jurisdictions wherein the "central determination" of outcomes is required by regulation or otherwise preferred. Thus, for example, outcomes may be determined centrally by a server, and then propagated (e.g., electronically) such that indications of the outcomes may be viewed using one or more gaming devices 450 (e.g., "Class II" gaming devices, thin client devices of a central-determination "Class III" gaming network, Video Lottery Terminals, and so on).

The processor 452 may also or alternatively be operable to communicate with one or more benefit output devices 464, which may comprise one or more components of the gaming device 450. The benefit output device 464 may, for example, comprise one or more devices for outputting a benefit (e.g., a standard and/or jackpot payout and/or a post-play benefit) to a player of the gaming device 450. For example, in one embodiment the gaming device 450 may provide coins and/or tokens as a benefit or post-play benefit. In such an embodiment the benefit output device 464 may comprise a hopper and/or hopper controller, for dispensing coins and/or tokens into a coin tray (not shown) of the gaming device 450.

In another example, the gaming device 450 may provide a receipt or other document on which there is printed an indication of a benefit or post-play benefit. For example, the gaming device may be operable to output one or more cash-out tickets, coupons, show tickets, or vouchers. In such an embodiment the benefit output device 464 may comprise a printing mechanism and/or a document dispensing mechanism.

In yet another example, the gaming device 450 may provide electronic credits as a benefit or post-play benefit (which, e.g., may be subsequently converted to coins and/or tokens and dispensed from a hopper into a coin tray). In such an embodiment the benefit output device 464 may comprise a credit meter balance and/or a processor that manages the amount of electronic credits that is indicated on a display of a credit meter balance. In some embodiments, this processor may be or include the processor 452 and/or another processing device.

In yet another example, the gaming device 450 may credit a monetary amount to a financial account associated with a player as a benefit or post-play benefit provided to a player. The financial account may be, for example, a credit card account, a debit account, a charge account, a checking account, and/or a casino account. In such an embodiment the benefit output device 464 may comprise a device for communicating with a server on which the financial account is maintained.

Note that, in one or more embodiments, the gaming device 450 may include more than one benefit output device 464 or more than one type of benefit output device 464. For example, the gaming device 450 may include each of (i) a hopper and hopper controller combination, (ii) a credit meter balance, and (iii) a document printing and dispensing combination. Such a gaming device 450 may be operable to provide more than one type of benefit to a player of the gaming device 450. A single benefit output device 464 may, according to some embodiments, be operable to output more than one type of benefit. For example, a benefit output device 464 may be operable to increase the balance of credits in a credit meter and communicate with a remote device in order to increase the balance of a financial account associated with a player. In some embodiments, the benefit output device 464 may be operable to alter or set the credit balance of another gaming device (e.g., separate and/or remote from the gaming device 450 of FIG. 4). In the case that a player earns or otherwise receives a post-play benefit while playing at another gaming device, for example, the benefit output device 464 may provide an indication to the other gaming device, where the indication is directed to providing the benefit to the player via the other gaming device.

In some embodiments, the processor 452 may also or alternatively be operable to communicate with one or more display devices 466, which may be or include one or more components of gaming device 450. The display device 466 may comprise, for example, one or more display screens or areas for outputting information related to game play on the gaming device 450, such as a cathode ray tube (CRT) monitor, a LCD screen, and/or light emitting diode (LED) screen.

In one or more embodiments, the gaming device 450 may comprise more than one display device 466. For example, the gaming device 450 may comprise an LCD display for displaying electronic reels, a display area that displays rotating mechanical reels, and an LED display of a player tracking device 468 that outputs information to a player.

The processor 452 may also or alternatively be in communication with one or more other output devices (not shown) besides the display device 466, for outputting information (e.g., to a player or another device). Such other output devices may also be components of the gaming device 450. Such other output devices may comprise, for example, an audio speaker (e.g., for outputting audio information corresponding to audio/video content), a headset or other private audio channel (e.g., for outputting supplemental audio to a player), an infra-red transmitter, a radio transmitter, an electric motor, a printer (e.g., such as for printing cashless gaming vouchers), a ticket or product dispenser, an infra-red port (e.g., for communicating with a second gaming device or a portable device of a player), a Braille computer monitor, and/or a coin or bill dispenser. Common output devices may include, for example, a CRT monitor on a video poker machine, a bell on a gaming device 450 (e.g., rings when a player wins), an LED display of a player's credit balance on a gaming device 450, and/or an LCD display of a PDA for displaying keno numbers.

The display device 466 may comprise, according to some embodiments, one or more display areas (not shown). For example, one of the display areas may display outcomes of games played on the gaming device 450 (e.g., electronic reels of the gaming device 450). Another of the display areas may display rules for playing a game of the gaming device 450. Yet another of the display areas may display the benefits (such as post-play benefits) obtainable by playing a game of the gaming device (e.g., in the form of one or more payout tables or a menu of available post-play benefits or conditions). In some embodiments, one or more of the display areas of the display device 466 may be operable to provide notifications of post-play benefits to a player. Such a notification may comprise, for example, a notification to the current player of the gaming device 450 that someone else has won post-play benefits due to the current player's actions or achievements, or a notification associated with post-play benefits a current player of the gaming device 450 has won from another gaming device.

In one or more embodiments, the gaming device 450 may include more than one display device 466, one or more other output devices, or a combination thereof (e.g., two display devices 466, two audio speakers, and a headset). In one embodiment, a first display area and a second display area may comprise two distinct areas of the same display device 466 (e.g., a slit screen or a window within a screen).

The processor 452 may also or alternatively be in communication with an input device 468, which may be a device that is capable of receiving an input (e.g., from a player or another device, such as a selection of an option or feature available on the gaming device, such as a selection of and/or registration for a post-play benefit) and which may be a component of the gaming device 450. The input device 468 may communicate with or be part of another device (e.g., the controller 210, 310 of FIG. 2 and/or FIG. 3, and/or another gaming device). For example, a player may use a touch screen input device 468 to indicate a desire to view types of post-play benefits available (e.g., for purchase) and/or to view a status of a payment or payment identifier previously provided by the player (e.g., as a means of payment for the opportunity to receive post-play benefits).

Some other examples of possible input devices 468 include: a bar-code scanner, an optical scanner configured to read other indicia of a voucher or cashless gaming ticket, a Charge-Coupled Device (CCD) camera, a magnetic stripe reader (e.g., for reading data encoded upon a player tracking card), a smart card reader (e.g., for reading data stored upon a smart card), a computer keyboard or keypad, a button, a handle, a lever, a keypad, a touch-screen, a microphone, an infrared sensor, a voice recognition module, a coin or bill acceptor, a sonic ranger, a computer port, a video camera, a motion detector, a digital camera, a network card, a USB port, a GPS receiver, a Radio Frequency IDentification (RFID) receiver, an RF receiver, a thermometer, a pressure sensor, an Infrared Radiation (IR) port (e.g., for receiving communications from a second gaming device or from a another device such as a smart card or PDA of a player), and/or a weight scale. Common input devices may include a button or touch screen on a video poker machine, a lever or handle connected to the gaming device 450, a magnetic stripe reader to read a player tracking card, and/or contract card inserted into the gaming device 450, a touch screen for input of player selections during game play, a paper ticket acceptor for accepting paper tickets such as cash-out tickets and a coin and bill acceptor.

In some embodiments, the gaming device 450 may comprise components capable of facilitating both input and output functions (i.e., input/output devices). In one example, a touch-sensitive display screen comprises an both an input device 468 and an output device such as the display device 466 (e.g., the device outputs graphics and receives selections from players). In another example, the processor 452 may communicate with a "ticket-in/ticket-out" device configured to dispense and receive cash-out tickets. Such a device may also assist in (e.g., provide data so as to facilitate) various accounting functions (e.g., ticket validation and redemption). For example, any or all of the gaming device 450, kiosk, and casino personnel device maintained at a cashier cage may (i) comprise such a benefit input/output device 464, 466, 468, and/or (ii) communicate with a central server that manages the accounting associated with such ticket-in/ticket-out transactions (e.g., so as to track the issuance, redemption and expiration of such tickets). One example of ticket-in/ticket-out technology that may be adapted or utilized to implement embodiments described herein is the EZ Pay™ system, which is manufactured by International Gaming Technology (IGT), headquartered in Reno, Nev.

Of course, it should be understood that the gaming device 450 may comprise various combinations of any or all of the component devices described herein. For example, in one or more embodiments, the gaming device 450 may include more than one display device 466, one or more other output devices, several input devices 468, and so on (e.g., two display screens, two audio speakers, a headset, a ticket-in/ticket-out device and several buttons).

The processor 452 may also or alternatively be in communication with a payment system 470, which may be a component of the gaming device 450. The payment system 470 may generally be a device capable of accepting payment from a player (e.g., a bet or initiation of a balance and/or a fee for registering for post-play benefits).

Exemplary methods of accepting payment by the payment system 470 may include (i) receiving hard currency (i.e., coins or bills), and accordingly the payment system 470 may comprise a coin or bill acceptor, (ii) receiving an alternate currency (e.g., a cash-out ticket, a coupon, a non-negotiable token), and accordingly the payment system 470 may comprise a bar code reader or other sensing means, (iii) receiving a payment identifier (e.g., a credit card number, a debit card number, a player tracking card number, and/or a code via a keypad or touch-screen), (iv) receiving a smart card having an indication of an amount of currency stored thereon, and/or (v) determining that a player has performed a value-added activity (e.g., participating in surveys, monitoring remote images for security purposes, referring friends to the casino).

The processor 405 may also or alternatively be operable to communicate with a player tracking device 472, which may be a component of the gaming device 450. Player tracking device 472 may, in one or more embodiments, comprise a reader device operable to read information from and/or write information to a card such as a smart card and/or a player tracking card, such that (i) players may be identified, and (ii) various data associated with players may then be determined. For example, a player's gaming activity (e.g., which gaming deices 450 are played at) may be tracked to determine a player's compliance with one or more requirements (such as a "scavenger hunt requirement) associated with qualifying for and/or triggering post-play benefits. Similarly, a number of cashable credits available to the player may be determined, a number of promotional credits that may not be redeemed for cash but that are associated with the player may be determined, a code or other indication of a benefit to be provided to the player may be determined, a number of accumulated loyalty points associated with the player may be determined, a number of accumulated game elements such as symbols, cards or hands associated with the player may be determined, etc. In one example, a card reader device may determine an identifier associated with a player (e.g., by reading a player tracking card comprising an encoded version of the identifier), such that the gaming device may then access data (e.g., of a player database and/or a session database) associated with the player. In another example, a smart card reader device may determine data associated with a player directly by accessing a memory of an inserted smart card.

As described in more detail elsewhere herein, a player database (such as the player database 320 of FIG. 3) may be used, for example, to store player wager data (e.g., such that players wagering over a given threshold in a given amount of time may be rewarded for their patronage, qualify for post-play benefits, and so on). The player database may also contain other information that may be useful in, for example, promoting and managing player behaviors (e.g., information about the player's gaming preferences, lodging arrangements, and the like). Further, the player database may store data regarding a given player's standing in a game session and/or a bonus game, so that the player can continue the game session and/or bonus game at a plurality of gaming device 450 that have common access to the player database. Such player data may be stored in a relational database and retrieved or otherwise accessed by the processor 452 after receiving a "key" data point from the player, such as a unique identifier read from the player's player tracking card or cashout ticket.

In one embodiment, the player tracking device 472 may comprise (i) a card reader (e.g., a port into which player tracking cards may be inserted), (ii) various input devices 468 (e.g., a keypad, a touch-screen), (iii) various output devices (e.g., a small, full-color display screen 466), and/or (iv) combinations thereof (e.g., a touch-sensitive display screen that accommodates both input and output functions). Various commercially available devices may be suitable for such an application, such as the NextGen™ interactive player tracking panel manufactured by IGT or the iVIEW display screen manufactured by BallyOR Gaming and Systems.

As is known in the art, "smart cards" may incorporate (i) a memory, and (ii) means for accessing such a memory. For example, in one embodiment, the smart card memory may store data related to aspects of embodiments described herein. In one embodiment, data may be written to the smart card as a player plays one or more gaming devices 450 (e.g., such that various data may be updated on a continuous, periodic or event-triggered bases). Accordingly, in one or more embodiments one or more devices operable to carry out various processes (e.g., a gaming device 450 or the controller 210, 310 of FIG. 2 and/or FIG. 3) may have associated therewith a smart card reader device, such that data may be read from the smart card pursuant to the execution of such processes. An example of a smart card system that may be used to implement one or more embodiments is the s-Choice™ Smart Card Casino Management System from Smart Card Integrators, Inc.™.

Of course, other non-card-based methods of identifying players are contemplated. For example, a unique identification code may be associated with the player. The player may then be identified upon entering the code. For example, the code may be stored (e.g., within a database maintained within the gaming device 450 or the controller 210, 310 of FIG. 2 and/or FIG. 3) such that the player may enter the code using the input device 468 of the gaming device 450, and accordingly allow the player to be uniquely identified. In other embodiments, player biometrics may also or alternatively serve as identification means (e.g., a player may be identified via a thumbprint and/or retinal scan of the player). In further embodiments, a barcode of a cashless gaming ticket may encode a player identifier.

Thus, as described, various data associated with a player may be tracked and stored (e.g., in an appropriate record of a centrally-maintained database such as the player database 320 of FIG. 3), such that it may be accessed as desired (e.g., when registering and/or otherwise qualifying a player to receive post-play benefits, when receiving a player's selection of a preferred post-play benefit and/or associated conditions, when receiving a payment from a player for the opportunity to receive post-play benefits, and so on). Further, various statistics may be measured in association with a player (e.g., coin-in statistics, win/loss statistics, buy-in amount for a session) and similarly accessed. As described herein, such statistics may be utilized to determine if one or more conditions associated with post-play benefits are satisfied.

Various systems for facilitating such monitoring of player behavior and activity are contemplated. For example, a two-wire system such as one offered by IGT may be used. Similarly, a protocol such as the IGT SAS™ protocol or the IGT SuperSAS™ protocol may be used. The SAS™ protocol and the SuperSAS™ protocol each allows for communication between gaming machines and slot accounting systems and provides a secure method of communicating all necessary data supplied by the gaming device to the online monitoring system. One aspect of the SAS™ protocol and the SuperSAS™ protocol that may be beneficial in implementing aspects of some embodiments is the authentication function which allows operators and regulators to remotely interrogate gaming devices 450 for important memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that continually monitors slot machines and customer gaming activity. Thus, for example, any one of these systems may be used to monitor a player's gaming activity in order to determine player outcomes, buy-in amounts, coin-in statistics, win/loss statistics and/or any other data deemed relevant.

In one embodiment, a player may operate a plurality of gaming devices 450. For example, a player may simultaneously play two side-by-side gaming devices 450, a player may play one gaming device 450 (e.g., a slot machine) and then continue a gaming session at another gaming device 450 (e.g., a video poker machine), and a player may remotely operate a gaming device 450, possibly by using a telephone, PDA, headset or other device (i) to transmit commands (directly or indirectly) to the gaming device 450, such as wager amounts and commands to select certain cards, and/or (ii) to receive output (directly or indirectly) from the gaming device 450.

In one embodiment, a gaming device 450 may allow a player to play a game of skill rather than a game of chance. Such an embodiment may be more appealing to certain players or may be permitted in areas where it is illegal to gamble on games of chance.

In one or more embodiments, various aspects such as facilitating play of a gaming device 450 under the terms of a contract (e.g., providing a benefit or post-play benefit during a period of time defined by the contract and/or monitoring the play to determine compliance with the contract), may be practiced or effectuated by changing (e.g., replacing, upgrading and/or augmenting) one or more components (e.g., hardware and/or software components) of an existing gaming device 450. Thus, in one or more embodiments, processes may be applied as a retrofit or upgrade to existing gaming devices currently available for play within various casinos.

For example, the memory 456 (e.g., one or more computer chips, hard drives or like structures) of the gaming device 450 may be changed (e.g., replaced or added), in which the replacement memory or additional memory stores a program (or portion of a program) that includes instructions. These instructions direct the processor 452 of the gaming device 450 to operate in accordance with one or more embodiments. In another example, data output via the gaming device 450 (e.g., graphical and/or textual data displayed via the gaming device 450) may be replaced or added, the replacement or additional data indicating to a player information relevant to one or more aspects associated with post-play benefits.

In a specific example, a gaming device 450 may comprise various electronic components mounted to one or more Printed Circuit Board (PCB) devices. Such components may include various hardware described herein, such as the communications port 454 and various controllers of peripheral devices (e.g., a display controller), as well as the memory 456 for storing programming instructions (software) and the processor 452 for carrying out such instructions. Forms of memory 456 that may be found in the gaming device 450 generally include Electronically Erasable Programmable ROM (EEPROM), Erasable Programmable ROM (EPROM), and/or flash memory. Thus, in one or more embodiments, an EPROM storing software with instructions for carrying out aspects of some embodiments (as well as instructions for carrying out other functions traditionally performed by the gaming device 450) may replace an EPROM previously installed in a gaming device 450 or may be reprogrammed in accordance with one or more embodiments described herein, such that the gaming device 450 may be configured to operate in accordance with various processes described herein.

In an embodiment, the memory 456 need not be replaced, but instead different data (e.g., a new program) can be stored on the memory 456 (e.g., an upgraded version of a program previously stored on the memory 456, a new program, a program which disables a portion or all of a program previously stored on the memory 456). Various manners are known for storing different or additional data on a memory 456, included a complete copying a program or set of programs from a local or remote memory storage device. For example, a peripheral memory device may be connected to a gaming device 450 (e.g., connect via a memory bus of the gaming device 450), in which the peripheral memory device directs the processor to ignore (fail to execute) certain other programs or portions of programs stored in other memory devices 456 (e.g., stored in an EEPROM present in the gaming device 450).

For example, a "post-play benefits" module may be made available for purchase to various casino operators. The module, which may comprise various hardware and software (e.g., an EEPROM storing software instructions), may be installed in an existing gaming device 450 (e.g., a video-reel slot machine and/or a video poker machine), such that when the module is installed, players of the device may elect (i) to play the gaming device in a manner that does not incorporate embodiments described herein, or (ii) to play the gaming device in a manner that incorporates embodiments described herein (e.g., be eligible for post-play benefits). Thus, players who are familiar with operating a gaming device 450 may elect to pay for them in a different or similar manner as they are accustomed to.

Accordingly, the gaming device 450 may be configured to allow a player to select one of two "modes" of the gaming device 450, and to enable the selected mode. If a player selects a "standard" mode, the gaming device 450 may be configured to operate in a manner similar to how it operated before the installation of the module (e.g., the gaming device 450 operates in a conventional manner, such that embodiments described herein may not be utilized). If a player selects the "post-play benefits" mode, the gaming device 450 may then be operable to execute game play in accordance with one or more embodiments described herein.

In one example of allowing a player to select one or more modes, a touch-sensitive display screen may be configured to output a prompt asking a player to select a mode of operation. Such a prompt may be output in occurrence to various trigger conditions (e.g., coins, bills or tickets are inserted, a credit balance increases from zero to some other number, a player presses a "play" button, and/or a motion, weight, infrared or other sensor detects the presence of a player). Accordingly, a player may select a mode of operation (e.g., by pressing an appropriately labeled icon of a touch-sensitive display screen), and upon receiving the player's selection, the gaming device 450 may be configured to operate in the selected mode.

In another embodiment, the gaming device 450 may be operable to automatically determine whether it should switch modes from a standard mode to a "post-play benefits" mode. A gaming device may perform such a determination, for example, by evaluating data received from a player and/or another device and/or by querying another device. For example, the gaming device 450 may be programmed to determine (e.g., upon receiving a player identifier and based upon the player identifier) whether the player currently playing the gaming device 450 qualifies to receive post-play benefits (e.g., satisfaction of the first condition at 102 in the method 100 of FIG. 1). In another embodiment, the gaming device 450 may be programmed to recognize that a player has requested and/or otherwise qualifies for post-play benefits. Upon determining that the player has indicated a desire to receive post-play benefits and/or that the player qualifies to receive post-play benefits, the gaming device 450 may further be programmed to retrieve and/or output information associated with the post-play benefits.

For example, the gaming device 450 may be programmed to access data (e.g., available post-play benefits and/or data associated with the satisfaction of conditions necessary for receiving post-play benefits) stored and/or available from on another device (e.g., the controller 210, 310 of FIG. 2 and/or FIG. 3, and/or another gaming device 450) or query such other device for an answer to the determination. If the gaming device 450 determines that the player qualifies for post-play benefits and/or that post-play benefits are available, the gaming device 450 may switch from a standard mode to a "post-play benefits" mode. In "post-play benefits" mode, for example, a gaming device 450 may be operable provide post-play benefits, determine if post-play benefits are available and/or have been won, and/or provide indications or notifications associated therewith. In one embodiment, the gaming device 450 may be operable to output an indication that it is currently in "post-play benefits" mode (e.g., to inform the player that the current play of the gaming device 450 is subject to a "lien" of another player and/or that the current play is qualified for post-play benefits). For example, the gaming device 450 may turn on a light, change graphics, output a sound, etc.

In other embodiments, a peripheral device may be useful for implementing one or more embodiments into the operation of a gaming device 450. For example, in order to avoid or minimize the necessity of modifying or replacing a program already stored in a memory of a gaming device 450, an external or internal module that comprises a peripheral device may be inserted in, connected to, coupled to, and/or otherwise associated with the gaming device 450. Such a peripheral device may be operable to, for example, monitor and/or transmit information about a player's gaming activity at the gaming device 450 to another device (e.g., the controller 210, 310 of FIG. 2 and/or FIG. 3, and/or another gaming device 450). The peripheral device may monitor and/or transmit such information to enable a determination of whether a player has qualified to receive post-play benefits (e.g., whether the player has provided appropriate payment and/or engaged in qualifying gaming or non-gaming activity) and/or whether a player has won a post-play benefit.

In still further embodiments, rather than configure gaming devices 450 to execute embodiments described herein by installing or connecting new hardware and/or software, software may be downloaded into an existing memory of one or more gaming devices 450. U.S. Pat. No. 6,805,634 to Wells et al. teaches methods for downloading data to gaming devices in such a manner. The downloading and communication aspects, concepts, and descriptions of which are hereby incorporated by reference herein. Thus, in some embodiments, a gaming device 450 may be reprogrammed to accommodate the new functionality of some embodiments without the need, and/or by minimizing the need, to remove and replace hardware within the gaming device 450.

In one embodiment, the gaming device 450 or another device operable to carry out one or more embodiments described herein (e.g., a kiosk) may be operable to output a menu of available post-play benefits and/or options associated therewith to a player via a player interface (not explicitly shown, although possibly incorporating any of the benefit output device 464, the display device 466, the input device 468, and/or the payment system 470. A player interface may comprise, for example, a video screen that is a touch screen operable to display such one or more such menus. A menu so displayed to a player may provide the player with, for example, a choice of available post-play benefits, a choice of conditions via which post-play benefits may be triggered, and/or an option to register for post-play benefits. In another example, a menu so displayed to a player may provide the player with an indication relating to the current availability of post-play benefits (such as information associated with a second player's actions and/or the current status of other conditions associated with the triggering of post-play benefits). A player may be presented with a menu of options via a touch screen, for example, upon indicating a desire to consider options available via such a menu and/or upon initiating play at the gaming device 450. A player may select an option from such a menu by touching the area of the screen on which the option appears.

It should be appreciated that one or more embodiments may include storing graphic and/or sound elements that are used to construct the menu of available options. These elements may be stored, for example, in EEPROM, flash memory, a hard disk, CD-ROM, and/or in any other suitable storage device. The menu may be displayed via any suitable display device 466, such as a CRT, LCD, VFC, and/or LED display. In one embodiment, the menu may be implemented using only dedicated electromechanical switches. In one embodiment, a player operates the input device 468 of the display device 466, in order to cause the menu to be displayed. In one embodiment, the device includes a touch screen and a touch screen controller (not shown) associated with a video monitor display device 466. The touch screen and touch screen controller may be operable to communicate with a video controller of the video monitor display device 466 and the processor 452. Thus, a player may be enabled to indicate decisions (e.g., which post play benefits are desired and/or which triggering conditions are desired) by touching the touch screen in the appropriate places.

In one embodiment, display of the menu preempts display of other information. For example, in one embodiment the same display device 466 or screen used to display indicia indicative of an outcome by displaying the indicia as disposed along a payline during active game play may be used to display a menu of available post-play benefits. In another embodiment, a dedicated display device 466 or screen may be used to display a menu of available post-play benefits on a continuous, periodic, or other basis.

It should be noted that not all of the components described herein as being components of gaming device 450 may be necessary and/or preferred for a gaming device 450 operable to implement embodiments described herein. For example, in embodiments in which the gaming device 450 comprises a PC operable to access an online casino, the random number generator 462 may not be a component of the gaming device 450 but may rather be a component of a server administering the online casino. In another example, the gaming device 450 that comprises a PC may not necessarily include the benefit output device 464 and/or the player-tracking device 472. Other variations of hardware and/or system components or configuration may also or alternatively be utilized to practice the embodiments described herein.

V. Data Structures

Examples of databases that may be used in connection with embodiments herein (such as with respect to the system 200 of FIG. 2, the controller 210, 310 of FIG. 2 and/or FIG. 3, and/or the gaming devices 250, 450 of FIG. 2 and/or FIG. 4) will now be described in detail with respect to FIG. 5 and FIG. 6. Each figure depicts a database in which the data is organized according to a data structure consistent with some embodiments. The data may be stored, for example, on a computer readable medium and be accessible by a program executed on a data processing system. These schematic illustrations and accompanying descriptions of the databases presented herein are exemplary, and any number of other database or data structure arrangements could be employed besides (or in addition to) those suggested by the figures.

A. Player database

Referring now to FIG. 5, a schematic view of a player database 520 according to some embodiments is shown. In some embodiments, the player database 520 may be similar in configuration and/or functionality to the player database 320 of FIG. 3. The player database 520 may include, for example, multiple records having multiple fields of information. Specifically, the player database 520 generally comprises multiple records, each record being associated with a particular player, as identified by a player ID number, and/or a gaming session or play associated with the player. The fields within each record may include, for example: a player ID field 522, a machine ID field 524, a time stamp field 526, a wager amount field 528, an outcome field 530, and/or a payout field 532. Having information related to one field, such as the player ID field 522, allows a server or other device (such as the controller 210, 310 of FIG. 2 and/or FIG. 3, and/or a gaming device 250, 450) to retrieve all information stored in corresponding fields 524, 526, 528, 530, 532 of that player record. It is to be understood that not all of these fields 522, 524, 526, 528, 530, 532 are necessary for operation of some embodiments.

In some embodiments, the player ID field 522 may generally store any type or configuration of identifier related to a player such as a unique alphanumeric player identifier (e.g., as shown). The identifier may comprise, for example, a player tracking number, player account number, hotel guest room number, social security number, etc. According to some embodiments, the machine ID field 524 may similarly provide an identifier for each machine that the player plays at. As shown in FIG. 5, the player may play multiple times and/or execute multiple outcomes at the same machine (e.g., machine ID “GMS-001”). The time stamp field 526 may generally include a time stamp associated with the player's interaction with the gaming device identified in the machine ID field 524. The time stamp may be recorded when the player initiates play at the machine, terminates play at the machine, receives an outcome via the machine, and/or upon the occurrence of other pertinent events. The time stamp may generally be utilized for player tracking and/or auditing purposes.

The wager amount field 528 may generally store an indication of an amount and/or magnitude of a wager that the player executes at the identified gaming device. Similarly, the outcome field 530 and the payout field 532 may store indications of outcomes and payouts, respectively, that the player has obtained via the gaming device (e.g., for a specific handle pull, hand, and/or play).

According to some embodiments, the functionality of determining player activities at a gaming device and/or plurality of gaming devices may also or alternatively be tracked and/or recorded by utilization of one or more machine databases. Each gaming device in a casino may be associated with a database and/or other information store, for example, in which a transaction history including player identifiers and gaming session information is stored. Such a database may include other machine-specific information such as a location of the gaming device, a network address of the gaming device, a serial number of the gaming device, etc.

B. Post-play Benefit database

Turning to FIG. 6, a schematic view of a post-play benefits database 640 according to some embodiments is shown. In some embodiments, the post-play benefits database 640 may be similar in configuration and/or functionality to the post-play benefits database 340 of FIG. 3. The post-play benefits database 640 may include, for example, multiple records having multiple fields of information. Specifically, the post-play benefits database 640 generally comprises multiple records, each record being associated with a particular post-play benefit and the conditions associated therewith. The fields within each record may include, for example: a post-play benefit ID field 642, condition fields 644*a-c*, and/or a post-play benefit field 646. The condition fields 644*a-c* may comprise, for example, a pre-qualification condition(s) field 644*a*, a triggering condition(s) field 644*b*, and/or a other condition(s) field 644*c*. Having information related to one field, such as the post-play benefit ID field 642, allows a server or other device (such as the controller 210, 310 of FIG. 2 and/or FIG. 3 and/or a gaming device 250, 450) to retrieve all information stored in corresponding fields 644*a*, 644*b*, 644*c*, 646 of that post-play benefit record. It is to be understood that not all of these fields 642, 644*a-c*, 646 are necessary for operation of some embodiments.

In some embodiments, the post-play benefit ID field 642 may generally store any type or configuration of identifier related to a post-play benefit such as a unique alphanumeric player identifier (e.g., as shown). According to some embodiments, the identifier may be a simple code utilized to identify a specific post-play benefit that is or may become available. The pre-qualification condition(s) field 644*a* may generally store information associated with one or more conditions or requirements that must be satisfied in order for a player to qualify for the given post-play benefit. The conditions stored in the pre-qualification condition(s) field 644*a* may, for example, be or include the first condition analyzed at 102 of the method 100 of FIG. 1.

Similarly, the conditions and/or requirements stored in the triggering condition(s) field 644*b* may comprise one or more conditions or requirements that must be satisfied to “trigger” the given post-play benefit. In some embodiments, the conditions stored in the triggering condition(s) field 644*b* may, for example, be or include the second condition analyzed at 104 of the method 100 of FIG. 1.

According to some embodiments, the information stored in the other condition(s) field 644*c* may comprise information associated with ancillary and/or supplemental conditions associated with a given post-play benefit. Even after a player qualifies for a post-play benefit that is triggered and/or activated, for example, the player may be responsible for satisfying one or more extra conditions to consummate the earning of the post-play benefit.

The post-play benefit field 646 may generally store information indicative of the benefit or benefits that may be earned in a post-play fashion by a player. In other words, the post-play benefit information may define a monetary amount, discount, free product or service, and/or other reward or benefit that the player may obtain in the case that the conditions (e.g., the pre-qualification conditions, triggering conditions, and/or other conditions) are satisfied.

VI. EXAMPLES

A. Examples Based on Exemplary Stored Data

With continued reference to FIG. 5 and FIG. 6 and the databases 520, 640 depicted therein, examples of certain embodiments will now be presented. The examples provided herein are solely exemplary in nature, are provided only to facilitate understanding of some embodiments, and are not to be construed as limiting in any respect.

Example A

A first player, player “ABC-110-F” from the player ID field 522 of the player database 520, plays at a particular gaming device, gaming device “GMS-001” from the machine ID field 524. Player “ABC-100-F” has registered for the opportunity to receive a particular post-play benefit, benefit “PPB-001” from the post-play benefit ID field 642 of the post-play benefit database 640. In accordance with the data stored in the pre-qualification condition(s) filed 644*a*, the first player “ABC-100-F” must wager fifty dollars ($50) or more at any gaming device within a given day to qualify for the post-play benefit “PPB-001” for that gaming device. In the current example, player “ABC-100F” has satisfied the relevant pre-qualification condition by wagering fifty dollars ($50) at the gaming device “GMS-001” in one day (specifically, player “ABC-100-F” wagered five dollars ($5) at three thirty in the afternoon (3:30 PM) at gaming device “GMS-001”, then five dollars ($5) at one minute (1-min) later (3:31 PM), then five dollars ($5) two minutes (2-min) after that (3:33 PM), then five dollars ($5) five minutes (5-min) later (3:38 PM), then fifteen dollars ($15) two minutes (2-min) after that (3:40 PM), then fifteen dollars ($15) at five-fifty in the afternoon (5:50 PM).

In addition to the potential benefit of five hundred dollars ($500), from the post-play benefit field 646 of the post-play benefits database 640 for the post-play benefit "PPB-001", player "ABC-100-F" is also potentially entitled to a fifty percent (50%) discount coupon for a casino buffet, as shown in the post-play benefit field 646 for the post-play benefit "PPB-002", because player "ABC-100-F" has also satisfied the relevant pre-qualification condition by playing at three (3) gaming devices ("GMS-001", "GMS-945", and "GMS-213") within one hour.

The relevant triggering condition for player "ABC-100-F" to receive the five hundred dollars ($500) as the post-play benefit "PPB-001" was satisfied when player "ABC-234-D" receives a payout of seven thousand dollars ($7,000) at the gaming device "GMS-001" within ten minutes (10-min) of the last wager of player "ABC-100-F" at the gaming device "GMS-001". In other words, since the second player "ABC-234-D" receives a payout of more than five thousand dollars (>$5,000) at the same gaming device "GMS-001" within ten minutes (10-min) of the first player "ABC-100-F" terminating play at the gaming device "GMS-001", the post-play benefit is available and/or triggered, and in some embodiments may be awarded to the first player "ABC-100-F".

Further, the relevant triggering condition for the first player "ABC-100-F" to receive the fifty percent (50%) discount coupon for a casino buffet as the post-play benefit "PPB-002" was satisfied when the second player "ABC-234-D" won (in this case, the seven thousand dollars ($7,000) that also triggered post-play benefit "PPB-001") at one of the machines ("GMS-001") within that same day. Accordingly, the second post-play benefit "PPB-002" may also or alternatively be awarded to the first player "ABC-100-F". In some embodiments, the first player "ABC-100-F" may be presented with a menu from one or more of the available post-play benefits ("PPB-001" or "PPB-002") may be selected for award and/or redemption.

Example B

A first player, player "FVG-347-A" from the player ID field 522, plays video poker at a gaming device "IWT-444". The first player "FVG-347-A" fails to obtain a royal flush as an outcome, and therefore qualifies based on the information stored in the pre-qualification condition(s) field 644*a*, for the third-listed post-play benefit "PPB-003". The first player "FVG-347-A" is thus potentially entitled to three (3) cards towards a royal flush the next time the first player "FVG-347-A" visits the same video poker machine "IWT-444".

The relevant triggering condition for the first player "FVG-347-A" to receive post-play benefit "PPB-003" is satisfied because a second player, player "YYU-938-X" obtained a royal flush at the video poker machine "IWT-444" later that same day. Thus, when the first player "FVG-347-A" initiates play at a video poker machine in the future, the first player "FVG-347-A" may be awarded three (3) cards toward a royal flush as a post-play benefit. In some embodiments, such as in the case that the first player "FVG-347-A" is playing video poker on a second machine when the post-play benefit is triggered, the first player "FVG-347-A" may receive the three (3) cards is part of the next outcome to be provided by that gaming device. The first player "FVG-347-A" may be notified of the award, of course, so that the first player "FVG-347-A" realizes and/or is able to clearly identify the benefit and/or why it was received.

B. Other Examples

Example C

After a period of time, a first player leaves a first machine having lost fifty dollars ($50). Because the first player has wagered a threshold amount of forty dollars ($40; e.g., a prequalification condition), the first player is entitled to a ten-dollar ($10) machine credit at a second machine (e.g., a post-play benefit) should a subsequent player (e.g., a second player) hit a jackpot at the first machine within the next hour (e.g., a triggering condition).

Example D

A first player inserts a player tracking card into a kiosk on the casino floor. The first player navigates a menu and selects an option to purchase, using a portion of an available comp point balance, the ability to win ten percent (10%) of any jackpot on the floor within the next five minutes (5-min; a prequalification condition). The first player also registers a cellular telephone number. Four minutes (4-min) after the registration, a one thousand dollar ($1,000) jackpot is won by a second player unknown to the first player (e.g., a triggering condition). A central computer transmits a message (e.g., an SMS message) to the first player's cellular telephone, informing the first player that one hundred dollars ($100) has been won (e.g., as a post-play benefit). The first player walks to a cashier's booth on the casino floor, and a casino clerk provides the first player with one hundred dollars ($100) in cash after confirming the first player's player tracking card number.

Example E

A first player who has played at three (3) machines of a particular manufacturer within a period of thirty minutes (30-min; a prequalification condition) receives, as a post-play benefit, the ability to download the latest Garth Brooks song to an Ipod®, after a second player wins five hundred dollars ($500) from one of the three (3) machines (a triggering condition).

Example F

A first player completes one hundred (100) handle pulls at a Wheel of Fortune® slot machine without winning more than two hundred dollars ($200; a prequalification condition). While playing at another Wheel of Fortune® slot machine located within the same bank as the first machine (an additional condition), a second player of the first Wheel of Fortune(® slot machine receives a bonus-round triggering outcome (a triggering condition). The first player receives, as a post-play benefit, the ability to play in the bonus round of the second Wheel of Fortune® slot machine. In other words, for example, the first player may automatically be allowed to enter a bonus round and/or interface with a bonus device (such as a bonus wheel).

Example G

A first player receives a Lemon-Bar-Lemon outcome at a first machine (a prequalification condition). The first player then purchases thirty minutes (30-min) of play at a second machine pursuant to a flat-rate play pricing model (an additional condition). During the first player's flat-rate play session at the second machine, a second player wins five hundred dollars ($500) at the first machine (a triggering condition). The first player is awarded an extra ten minutes (10-min) of play at the second machine (a post-play benefit).

Example H

A first player leaves a first machine a net loser (a prequalification condition). The first player continues the losing streak at a second machine (an additional condition), during which a second player wins the jackpot at the first machine (a triggering condition). The first player is awarded two percent (2%) of the second player's net winnings (a post-play benefit) .

Example I

A first player wagers at least one (1) credit at a first machine (a prequalification condition). Within one hour (1-hr) of leaving the first machine, the first player wagers at least one (1) credit at each of at least three (3) different WMS® Gaming machines (an additional condition). Within thirty minutes (30-min) of leaving the first machine, a second player hits a jackpot (a triggering condition). The first player is awarded a twenty-dollar ($20) credit at any WMS® Gaming machine (a post-play benefit). Upon presenting a player tracking card at any WMS® Gaming machine, the credit balance of the first player automatically increases to twenty dollars ($20).

Example J

A first player leaves a first machine a net loser (a prequalification condition). Because over ten minutes (10-min) pass before a second player wins one hundred dollars ($100) at the first machine, the first player is only entitled to ten dollars ($10), whereas the first player would have been entitled to twenty dollars ($20) had the second player won the one hundred dollars ($100) within the first ten minutes (10-min).

Example K

A first player receives ten (10) consecutive losing outcomes at a first machine (e.g., a prequalification condition). A second player then achieves a payout of one thousand (1,000) or more coins (e.g., a first occurrence of a triggering condition). Accordingly, the first player is awarded a payout equal to ten percent (10%) of the second player's payout. The second player may then achieve another payout of one thousand (1,000) or more coins (e.g., a second occurrence of a triggering condition). Accordingly, the first player may then be awarded a payout equal to five percent (5%) of the second player's payout. The second player may then achieve a third payout of one thousand (1,000) or more coins (e.g., a third occurrence of a triggering condition), though for this occurrence, the first player may not be awarded a payout. In this manner, the first player may receive benefits of lesser value and/or may not receive benefits as incremental occurrences of triggering conditions transpire. It should be understood that the opposite effect may also or alternatively be implemented. In some embodiments, since the probability of the second player satisfying the triggering condition is likely to significantly decrease with each occurrence, the first player may be awarded a larger percentage of the second player's payout with each successive and/or subsequent satisfaction of the triggering condition.

VII. Exemplary Process

Figure 7:
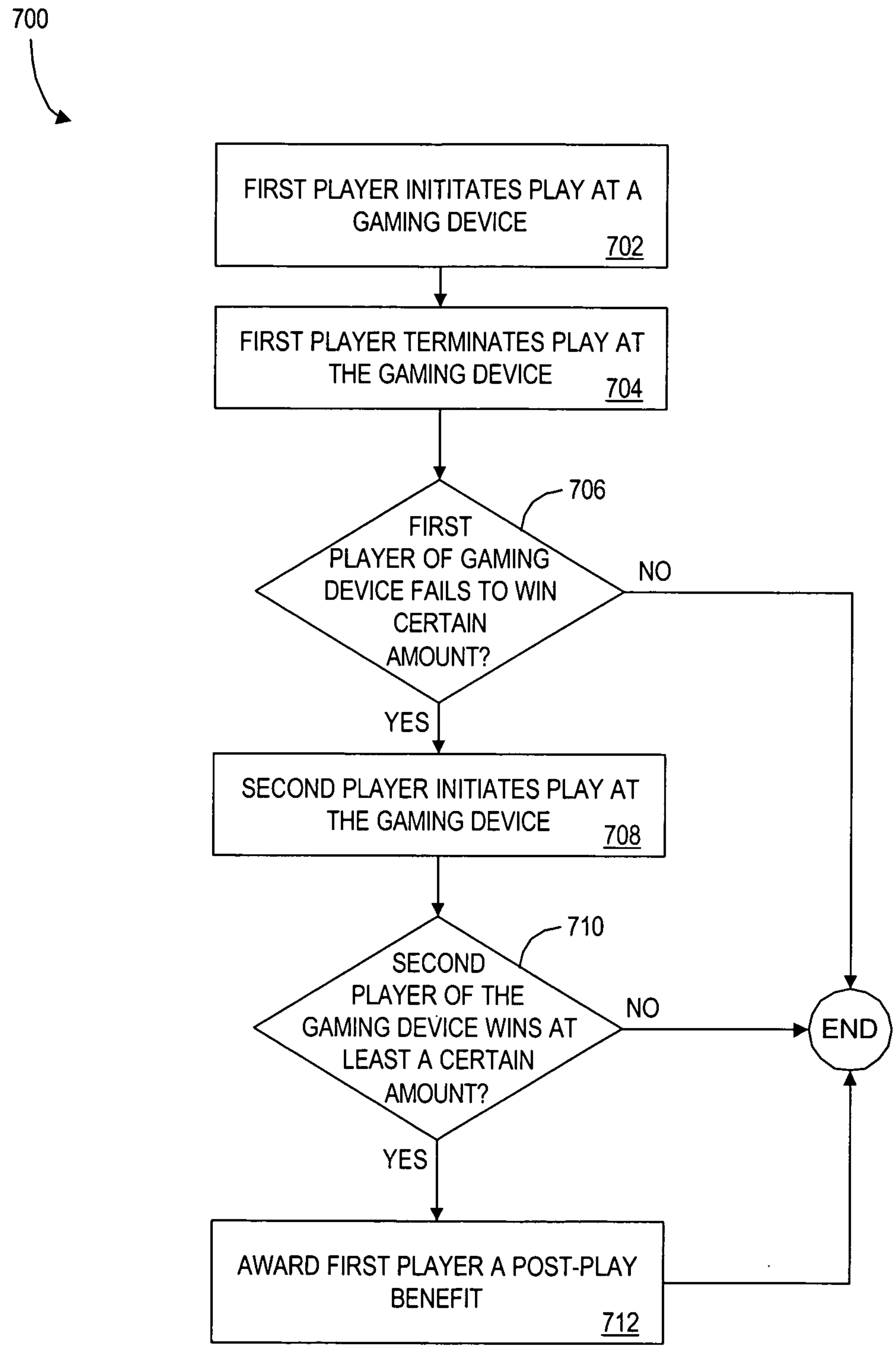
FIG. 7 is a flow diagram of a method according to some embodiments.

Turning to FIG. 7, a flow diagram of a method 700 according to some embodiments is shown. The method 700 may, for example, illustrate an exemplary operation of the system 200 of FIG. 2, of the controller 210, 310 of FIG. 2 and/or FIG. 3, and/or of one or more gaming devices 250, 450 of FIG. 2 and/or FIG. 4. In some embodiments, the method 700 may be related to, include, and/or may be otherwise associated with the method 100 described in conjunction with FIG. 1.

According to some embodiments, the method 700 may begin when a first player initiates play at a gaming device, at 702. The initiation of such play may be determined and/or identified, for example, when the first player inserts a player tracking card, cashless gaming ticket, and/or coins or tokens into the gaming device. In some embodiments, the play may be determined to begin when an outcome is initiated and/or provided by the gaming device. According to some embodiments, the first player may play at the gaming device for some time. The first player may, for example, begin to feel more "invested" in the particular gaming device the longer the first player continues to play at the gaming device.

In some embodiments, the method 700 may continue at 704 where the first player terminates play at the gaming device. After some number of received outcomes, for example, the first player may decide to terminate play and may provide an indication of such decision (e.g., by pressing a "cash out" button or the like). In some embodiments, play may simply terminate in the case that insufficient credits remain in the gaming device for the first player.

The method 700 may then continue, for example, to determine whether the first player of the gaming device failed to win a certain amount at the gaming device, at 706. Once play is terminated, for example, the gaming device, a peripheral device, and/or a server or controller may determine certain characteristics associated with the first player's terminated session of play at the gaming device. According to some embodiments, metrics instead of or in addition to an amount of the first player's winnings may be determined (e.g., as described elsewhere herein). In some embodiments, such metrics may be compared to pre-determined levels or thresholds. In the case that the first player registered (and/or paid a fee) for the opportunity to receive post-play benefits, for example, a pre-determined level of desired winnings at the gaming device may have been established, and the first player's actual winnings (or lack thereof) may be compared to this desired level. In some embodiments, if the actual level of the first player's winnings (or other metric of play) fails to meet the desired level, then the first player may be deemed qualified to receive post-play benefits associated with the gaming device. In other words, since the first player "invested" an amount of time at the gaming device (perhaps a qualifying and/or certain amount of time) and yet failed to win a predetermined minimum threshold amount, the first player may qualify for the chance to receive post-play benefits that may, at least partially, make up for the first player's losses during the previous session of play at the gaming device. In some embodiments, if the first player does not fail to win a certain amount (i.e., wins more than a pre-determined minimum) and/or otherwise fails to satisfy pre-determined criteria, then the first player may not qualify for post-play benefits and the method 700 may simply end.

Assuming that the first player does qualify for post-play benefits (e.g., at 706), the method 700 may continue at 708, in some embodiments, when a second player initiates play at the gaming device. The second play may initiate play and/or provide indications thereof in a manner similar to the first player. The second player may, for example, insert a player tracking card and/or coins into the gaming device and begin playing. In some embodiments, the potential award of post-play benefits to the first player may be predicated upon actions and/or achievements of the second player. In the case that the first player registered and/or paid for the opportunity of post-play benefits, for example, the first player may have selected (and/or been assigned) one or more triggering criteria associated with subsequent play of the gaming device by other players (such as the second player).

The method 700 may continue at 710, for example, to determine if the second player of the gaming device wins at least a certain amount at the gaming device. The determination may be made, in some embodiments, during the session of play of the second player or upon termination of the session. In some embodiments, the triggering criteria may comprise conditions instead of or in addition to the amount of winnings of the second player (e.g., as described elsewhere herein). According to some embodiments, if the second player fails to meet and/or achieve the triggering criteria, then the method 700 may simply end. In other embodiments, if the criteria is satisfied by the second player, then the method 700 may continue to 712 to award post-play benefits to the first player.

In other words, since the second player managed to win a certain amount (and/or otherwise trigger the post-play benefits) at the gaming device, subsequent to the first player's failed attempt (even after spending a great deal of time at the gaming device, perhaps), the first player provided with an award, to at least partially make the first player feel that the previous session of play at the gaming device was not time pent in vain. According to some embodiments, the post-play benefit may even comprise a percentage of the second player's winnings, further tying the second player's performance at the gaming device to the benefit of the first player.

While this exemplary process has been described with reference to particular conditions and/or metrics, it should be understood, particularly in light of the many embodiments described herein, that other conditions and/or metrics may freely be substituted for those presented in the current exemplary process. Further, fewer or additional conditions and/or metrics may be considered in determining whether and/or when to award post-play benefits to a player. It should also be noted (as described elsewhere herein) that the second player may comprise any number of second players. The second player and post-play benefit triggering conditions associated therewith may comprise, for example, a requirement that one or more of the five (5) players of the gaming device subsequent to the first player achieve certain results at the gaming device (individually and/or collectively).

VIII. Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s). The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices that would, in those other embodiments, have such functionality and/or features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" means any one or more microprocessors, CPU devices, computing devices, microcontrollers, digital signal processors, or like devices.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method of operating a gaming device, comprising:

(a) identifying, via a player tracking device in association with the gaming device, a player at the gaming device;

(b) determining, via a processor of the gaming device, whether the gaming device is receiving, in association with the identified player, any wagers placed on any plays of any wagering games at the gaming device;

(c) if the gaming device is receiving, in association with the identified player, any wagers placed on any plays of any wagering games and the player tracking device is tracking play of the identified player at the gaming device:

(i) determining, via the processor of the gaming device, whether a condition associated with the identified player of the gaming device is satisfied on the gaming device, and (ii) repeating (b) to (c) until the processor of the gaming device determines that the gaming device is no longer receiving, in association with the identified player, any wagers placed on any plays of any wagering games at the gaming device and the player tracking device is not tracking any play of the identified player at the gaming device; and (d) after the gaming device is no longer receiving, in association with the identified player, any wagers placed on any plays of any wagering games at the gaming device and after the player tracking device has stopped tracking any play of the identified player at the gaming device:

(i) determining, via the processor of the gaming device, whether a qualifying event has occurred in association with the gaming device no longer being played by the identified player;

(ii) in response to the condition being satisfied and the qualifying event having occurred, causing a benefit to be provided to the identified player; and (iii) in response to at least one of: the condition not being satisfied and the qualifying event having not occurred, not providing the benefit to the identified player.

2. The method of claim 1, further comprising:

notifying the identified player of the provided benefit.

3. The method of claim 2, which includes at least one of:

(i) causing another gaming device to indicate the awarding of the benefit to the identified player;

(ii) causing a telephone associated with the identified player to indicate the awarding of the benefit to the identified player;

(iii) causing a pager associated with the identified player to indicate the awarding of the benefit to the identified player;

(iv) causing a PDA associated with the identified player to indicate the awarding of the benefit to the identified player; and (v) causing a computer associated with the identified player to indicate the awarding of the benefit to the identified player.

4. The method of claim 1, further comprising:

registering the identified player for the opportunity to receive the benefit if the gaming device is not receiving, in association with the identified player, any wagers placed on any plays of any wagering games.

5. The method of claim 4, which includes at least one of:

(i) causing the gaming device to enable the registration of the identified player;

(ii) causing another gaming device to enable the registration of the identified player;

(iii) causing a kiosk to enable the registration of the identified player;

(iv) causing a customer service desk to enable the registration of the identified player; and (v) causing a website to enable the registration of the identified player.

6. The method of claim 1, wherein the condition comprises at least one of, a requirement that the identified player:

(i) play at the gaming device, wherein the gaming device is a designated gaming device of a plurality of different gaming devices;

(ii) play at the gaming device, wherein the gaming device is a gaming device of a designated manufacturer;

(iii) play a designated type of wagering game at the gaming device;

(iv) play at the gaming device and one or more other associated gaming devices;

(v) establish a balance of credits at the gaming device;

(vi) establish a balance of credits at the gaming device within a specified period of time;

(vii) purchase a designated number of outcomes of the gaming device;

(viii) purchase a designated number of outcomes of the gaming device within a designated period of time;

(ix) wager a certain amount at the gaming device;

(x) achieve a certain rate of play at the gaming device;

(xi) win a certain amount at the gaming device;

(xii) win a certain amount at the gaming device within a designated period of time;

(xiii) not win a certain amount at the gaming device;

(xiv) not win a certain amount at the gaming device within a designated period of time;

(xv) lose a certain amount at the gaming device;

(xvi) lose a certain amount at the gaming device within a designated period of time;

(xvii) obtain a certain outcome at the gaming device;

(xviii) obtain a certain outcome at the gaming device within a designated period of time;

(xix) not obtain a certain outcome at the gaming device;

(xx) not obtain a certain outcome at the gaming device within a designated period of time;

(xxi) use a player tracking card associated with the identified player;

(xxii) sign up for a player tracking card;

(xxiii) purchase a premium player tracking account;

(xxiv) earn a certain number of complimentary points;

(xxv) earn a certain number of complimentary points at the gaming device;

(xxvi) register at a hotel;

(xxvii) register at a casino;

(xxviii) complete a purchase;

(xxix) apply for a credit card; and (xxx) play at the gaming device for a certain duration.

7. The method of claim 1, wherein the condition comprises the identified player playing at the gaming device during at least one of:

(i) a designated time of day;

(ii) a designated day of the week;

(iii) a designated day of the month;

(iv) a designated day of the year;

(v) a designated week of the month;

(vi) a designated week of the year; and (vii) a designated month of the year.

8. The method of claim 1, wherein the gaming device comprises a first gaming device and the condition comprises at least one of, a requirement that the identified player:

(i) play at a second gaming device;

(ii) play at a second gaming device that is the same type of gaming device as the first gaming device;

(iii) play at a second gaming device that is specifically spatially related to the first gaming device;

(iv) play at a second gaming device that is at a certain location; and (v) play at a second gaming device and achieve a certain value of a specific parameter associated with the second gaming device.

9. A method of operating a gaming device, said method comprising:

(a) receiving, via a processor of the gaming machine, at least one wager from a player at the gaming device, the at least one wager being associated with a gaming session at the gaming device, the gaming session including at least one play of at least one wagering game;

(b) determining, via the processor of the gaming device, at least one outcome for the gaming session at the gaming device;

(c) displaying, via a display device of the gaming device, the at least one determined outcome;

(d) identifying, via a player tracking device in association the gaming device, the player associated with the gaming session at the gaming device;

(e) determining, via the processor of the gaming device, whether the identified player terminates the gaming session at the gaming device;

(f) if the identified player has not terminated the gaming session at the gaming device and the player tracking device is tracking play of the identified player at the gaming device:

(i) determining, via the processor of the gaming device, whether a condition has occurred at the gaming device, and (ii) repeating (a) to (f) until the processor of the gaming device determines that the identified player has terminated the gaming session at the gaming device, the player tracking device determines that the identified player is no longer playing at the gaming device and the player tracking device is not tracking any play of the identified player at the gaming device; and (g) after the identified player has terminated the gaming session at the gaming device, after the identified player is no longer playing at the gaming device and after the player tracking device has stopped tracking any play of the identified player at the gaming device:

(i) determining, via the processor of the gaming device, whether a designated event has occurred at the gaming device;

(ii) in response to the condition and the designated event having both occurred at the gaming device, causing a post-play benefit to be provided to the identified player; and (iii) in response to at least one of: the condition not being satisfied and the designated event having not occurred at the gaming device, not providing the post-play benefit to the identified player.

10. The method of claim 9, further comprising:

registering the identified player for the post-play benefit.

11. The method of claim 9, which includes:

causing the post-play benefit to be provided to the identified player via another gaming device.

12. The method of claim 1, wherein the gaming device is in communication with a server to provide the play of the wagering game.

13. The method of claim 9, wherein the gaming device is in communication with a server to provide the play of the wagering game.

* * * * *

UNITED STATES PATENT AND TRADEMARK OFFICE

CERTIFICATE OF CORRECTION

PATENT NO. : 8,814,669 B2
APPLICATION NO. : 11/297017
DATED : August 26, 2014
INVENTOR(S) : Jay S. Walker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1779 days.

In the Claims:

In Claim 4, Column 40, Line 64, replace the second instance of "the" with --an--.
In Claim 9, Column 42, Line 19, replace "machine" with --device--.

Signed and Sealed this
Fourth Day of August, 2015

Michelle K. Lee
*Director of the United States Patent and Trademark Office*